(12) United States Patent
Abrol et al.

(10) Patent No.: US 11,704,804 B2
(45) Date of Patent: Jul. 18, 2023

(54) DOMAIN ADAPTATION USING POST-PROCESSING MODEL CORRECTION

(71) Applicant: GE Precision Healthcare LLC, Milwaukee, WI (US)

(72) Inventors: Sidharth Abrol, Bangalore (IN); Bipul Das, Chennai (IN); Sandeep Dutta, Celebration, FL (US); Saad A. Sirohey, Pewaukee, WI (US)

(73) Assignee: GE PRECISION HEALTHCARE LLC, Wauwatosa, WI (US)

(*) Notice: Subject to any disclaimer, the term of this patent is extended or adjusted under 35 U.S.C. 154(b) by 306 days.

(21) Appl. No.: 16/899,835

(22) Filed: Jun. 12, 2020

(65) Prior Publication Data

US 2021/0312674 A1 Oct. 7, 2021

(30) Foreign Application Priority Data

Apr. 2, 2020 (IN) .............................. 202041014655

(51) Int. Cl.
*G06N 5/04* (2023.01)
*G06T 7/11* (2017.01)
(Continued)

(52) U.S. Cl.
CPC .............. *G06T 7/11* (2017.01); *G06F 18/214* (2023.01); *G06N 20/00* (2019.01); *G06T 7/10* (2017.01);
(Continued)

(58) Field of Classification Search
CPC ...... G06K 9/6256; G06K 9/62; G06K 9/6217; G06K 9/6253; G06K 9/6257;
(Continued)

(56) References Cited

U.S. PATENT DOCUMENTS 9,785,855 B2  10/2017  Gordo Soldevila et al.
9,892,361 B2   2/2018  Nguyen et al.
(Continued)

FOREIGN PATENT DOCUMENTS

| CN | 110909783 | * 11/2019 | |
| WO | 2017044189 A1 | 3/2017 | |
| WO | WO-2019092456 A1 | * 5/2019 | ........... G05B 13/027 |

OTHER PUBLICATIONS

Larrazabal, et al., "Anatomical Priors for Image Segmentation via Post-Processing with Denoising Autoencoders," arXiv:1906.02343v1 [eess.IV] Jun. 5, 2019, 10 pages.
(Continued)

*Primary Examiner* — Quan M Hua
(74) *Attorney, Agent, or Firm* — Amin, Turocy & Watson, LLP

(57) ABSTRACT

Techniques are described for domain adaptation of image processing models using post-processing model correction According to an embodiment, a method comprises training, by a system operatively coupled to a processor, a post-processing model to correct an image-based inference output of a source image processing model that results from application of the source image processing model to a target image from a target domain that differs from a source domain, wherein the source image processing model was trained on source images from the source domain. In one or more implementations, the source imaging processing model comprises an organ segmentation model and the post-processing model can comprise a shape-autoencoder. The method further comprises applying, by the system, the source image processing model and the post-processing model to target images from the target domain to generate optimized image-based inference outputs for the target images.

27 Claims, 18 Drawing Sheets

(51) Int. Cl.
  *G06T 11/00*  (2006.01)
  *G06N 20/00*  (2019.01)
  *G06T 7/10*  (2017.01)
  *G06F 18/214*  (2023.01)
  *G06V 10/774*  (2022.01)

(52) U.S. Cl.
  CPC ........ *G06T 11/003* (2013.01); *G06V 10/7753* (2022.01)

(58) Field of Classification Search
  CPC .. G06K 9/6259; G06K 9/6262; G06K 9/6267; G06K 9/6268; G06K 9/627; G06N 3/0454; G06N 20/00; G06N 3/0472; G06N 3/08; G06N 3/088; G06N 3/02; G06N 3/0427; G06N 7/005; G06T 11/003; G06T 7/10; G06T 2207/10081; G06T 2207/20081; G06T 2207/20084; G06T 2207/30004; G06T 7/0012; G06T 7/11
  See application file for complete search history.

(56) References Cited

U.S. PATENT DOCUMENTS

| | | | |
|---|---|---|---|
| 10,395,772 B1* | 8/2019 | Lucas | G16H 50/70 |
| 2015/0228079 A1* | 8/2015 | Murarka | G06T 7/593 |
| | | | 345/419 |
| 2016/0078359 A1* | 3/2016 | Csurka | G06V 10/776 |
| | | | 706/12 |
| 2016/0210749 A1* | 7/2016 | Nguyen | G06N 3/0454 |
| 2017/0140253 A1 | 5/2017 | Wshah et al. | |
| 2018/0330205 A1* | 11/2018 | Wu | G06V 10/454 |
| 2019/0066493 A1* | 2/2019 | Sohn | G06V 10/82 |
| 2019/0130220 A1* | 5/2019 | Zou | G06K 9/6274 |
| 2021/0073584 A1* | 3/2021 | St. Romain, II | G06N 3/088 |
| 2021/0150702 A1* | 5/2021 | Claessen | G06N 3/08 |

OTHER PUBLICATIONS

Kouw, et al., "Technical Report: An introduction to domain adaptation and transfer learning," arXiv:1812.11806v2 [cs.LG] Jan. 14, 2019, 42 pages.

Venkataramani, et al., "Towards Continuous Domain adaptation for Healthcare," arXiv:1812.01281v1 [cs.CV] Dec. 4, 2018, 5 pages.

Hoffman, et al., "Cycada: Cycle-Consistent Adversarial Domain Adaptation," arXiv:1711.03213v3 [cs.CV] Dec. 29, 2017, 15 pages.

Tzeng, et al., "Adversarial Discriminative Domain Adaptation," arXiv:1702.05464v1 [cs.CV] Feb. 17, 2017, 10 pages.

Ganin, et al., "Domain-Adversarial Training of Neural Networks," arXiv:1505.07818v4 [stat.ML] May 26, 2016, 35 pages.

Dou, et al., "PnP-AdaNet: Plug-and-Play Adversarial Domain Adaptation Network with a Benchmark at Cross-modality Cardiac Segmentation," arXiv: 1812.07907v1 [cs.CV] Dec. 19, 2018, 10 pages.

Zhu, et al., "Unpaired Image-to-Image Translation using Cycle-Consistent Adversarial Networks," arXiv:1703.10593v6 [cs.CV] Nov. 15, 2018, 18 pages.

Chen, et al., "Semantic-Aware Generative Adversarial Nets for Unsupervised Domain Adaptation in Chest X-ray Segmentation," arXiv:1806.00600v2 [cs.CV] Jun. 5, 2018, 8 pages.

Xue, et al., "Shape-Aware Organ Segmentation by Predicting Signed Distance Maps," arXiv:1912.03849v1 [cs.CV] Dec. 9, 2019, 8 pages.

* cited by examiner

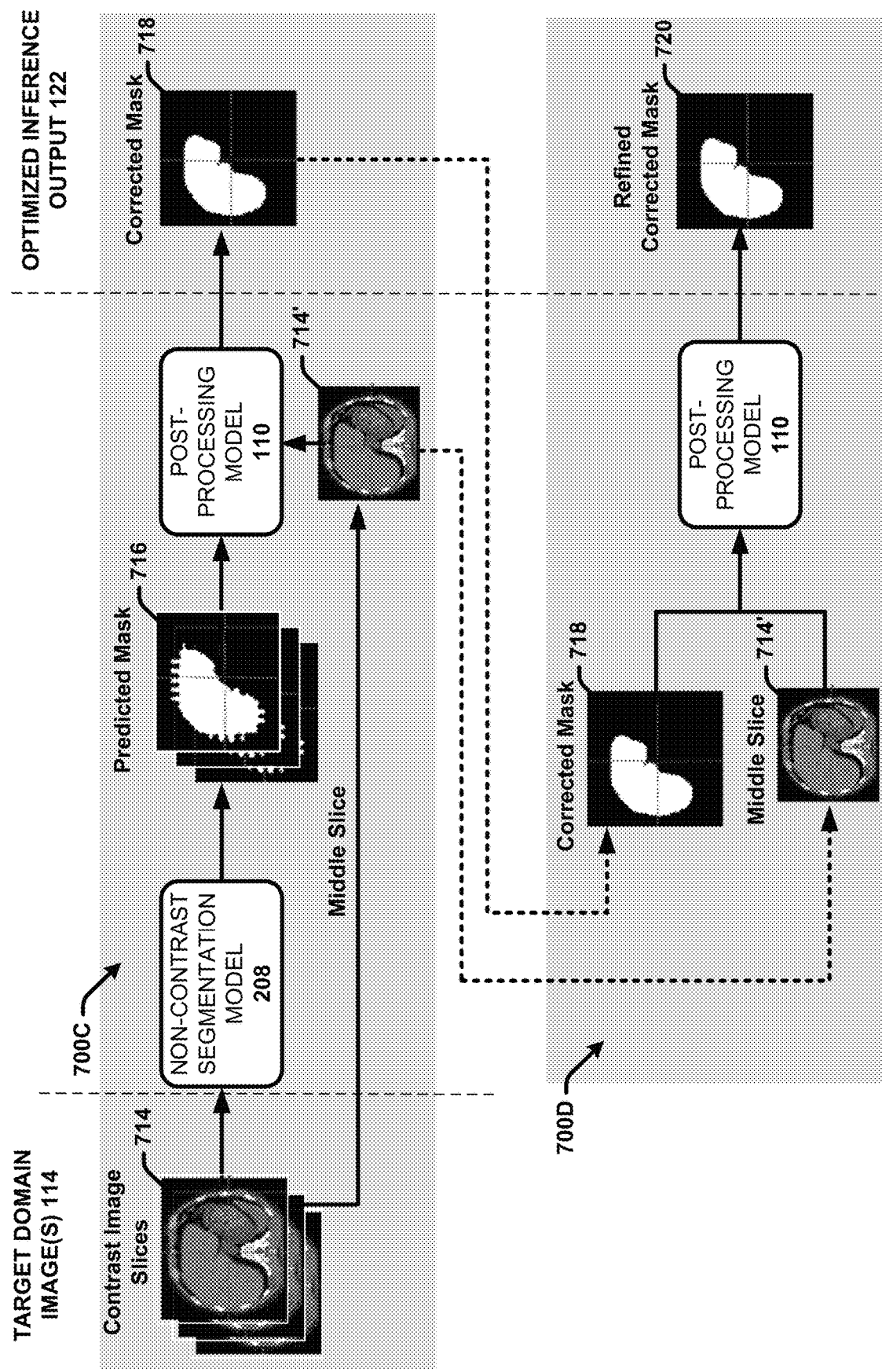

DOMAIN ADAPTATION USING POST-PROCESSING MODEL CORRECTION

RELATED APPLICATION

This application claims priority to India Patent Application No. 202041014655 filed Apr. 2, 2020 and titled "DOMAIN ADAPTATION USING SHAPE AUTOENCODERS," the entirety of which application is incorporated herein by reference.

TECHNICAL FIELD

This application relates to domain adaptation of machine learning (ML) models, and more particularly to domain adaptation of image processing ML models using post-processing model correction.

BACKGROUND

Artificial intelligence (AI) models are used in medical image processing and analysis tasks like organ segmentation, anomaly detection, image reconstruction, and so on, for auto-annotating scans and generating reports for clinicians, thereby improving productivity and reducing cost for healthcare providers. For example, organ segmentation is an important task with many clinical applications, including radiotherapy (RT) planning for delineating organs at risk (OAR), organ volumetry for surgical planning, disease diagnostics and others.

Most often, AI-based medical image processing models are trained on a specific type of source domain data and are expected to work on images from other cohorts and similar domains with reasonable accuracy. However, these models, when tested on a different but similar target domain scans, owing to changes in protocol, demography or other variations, perform at much lower accuracy than expected. An example of this includes an organ segmentation model trained on non-contrast medical images. When the organ segmentation model is used on the same type of medical images that differ only with respect to having contrast, the resulting organ segmentation masks are inaccurate. Thus, there is a need to improve the predictions of AI-based medical image processing models on images from a different but similar target domain on which the models were not trained.

SUMMARY

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. In one or more embodiments described herein, systems, computer-implemented methods, apparatus and/or computer program products are described that facilitate domain adaptation of image processing models using post-processing model correction.

According to an embodiment, a system is provided that comprises a memory that stores computer executable components, and a processor that executes the computer executable components stored in the memory. The computer executable components can comprise a training component that trains a post-processing model to correct an image-based inference output of a source image processing model that results from application of the source image processing model to a target image from a target domain that differs from a source domain, wherein the source image processing model was trained on source images from the source domain. For example, the source images and the target images can comprise images of a same object that differ with respect to at least one visual appearance property. In another non-limiting example, the source images and the target images can comprise medical images of a same type of body part yet differ with respect to capture modality. In some implementations, the source images and the target images comprise computed tomography (CT) scans and the source images and the target images can differ with respect to having or not having contrast. The computer executable components can further comprise an image processing component that applies the source image processing model and the post-processing model to target images from the target domain to generate optimized image-based inference outputs for the target images. In various implementations, the image processing component applies the post-processing model to correct intermediate image-based inference outputs generated based on application of the source image processing model to the target images, resulting in the optimized image-based inference outputs.

The type of the source image processing model can vary. For example, the source imaging processing model can comprise at least one of: a segmentation model, an object recognition model, an anomaly detection model, or an image reconstruction model. In various embodiments, the source imaging processing model comprises an organ segmentation model, and the image-based inference output generated by the source image processing model comprises an organ segmentation mask. In some implementations, of these embodiments, the post-processing model can be configured to correct inaccuracies in segmentation masks generated based on application of a source domain segmentation model to images from the target domain.

In various embodiments, the post-processing model comprises a shape autoencoder. In some implementations, the training component can train the post-processing model using an unsupervised machine learning process without ground truth training data for the target domain. Additionally, or alternatively, the training component can train the post-processing model using a semi-supervised machine learning process with ground truth training data for the source domain and at least some ground truth training data for the target domain.

In some implementations, the post-processing model comprises a single channel input model that receives as input, a single intermediate image-based inference output generated based on application of the source image processing model to a single target domain image and generates an optimized image-based inference result as output (e.g., a corrected segmentation mask). Additionally, or alternatively, the post-processing model can comprise a multi-channel input model that receives as input, a plurality of intermediate image-based inference outputs respectively generated based on application of the source image processing model to consecutively captured target images and generates an optimized image-based inference result as output. The post-processing model can also receive at least one of the consecutively captured target images as input.

In some embodiments, elements described in the disclosed systems can be embodied in different forms such as a computer-implemented method, a computer program product, or another form.

DESCRIPTION OF THE DRAWINGS

FIGS. 7A and 7B present example processes that involve single and multi-channel input and output flows with at least one of the target domain images as input to the post-processing model in accordance with one or more embodiments of the disclosed subject matter.

DETAILED DESCRIPTION

Figure 1:
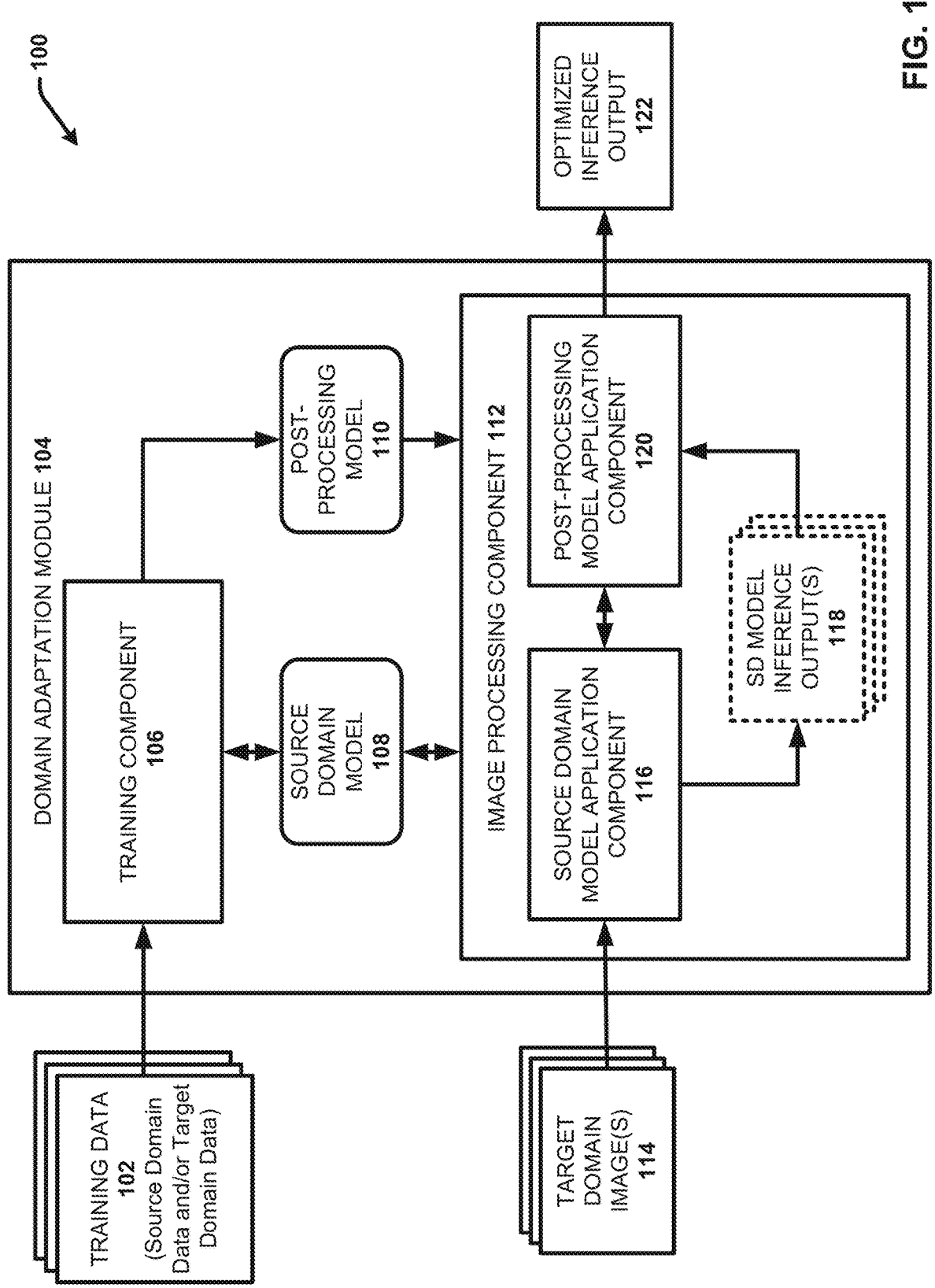
FIG. 1 illustrates a block diagram of an example, non-limiting system that facilitates domain adaptation of image processing models in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Summary section or in the Detailed Description section.

Domain adaptation is an active area of research where various methods have been used to effectively adapt models trained for an original application for new target applications. The ideal approach towards domain adaptation is that while training of the model itself the data used should be an unbiased representation of source and target domains. However, this is not always feasible as the data distributions between the source domain data on which the network is trained and the target domain data is shifted. This leads to low network performance on the target domain data.

The disclosed subject matter is directed to systems, computer-implemented methods, apparatus and/or computer program products that facilitate domain adaptation of image processing models with no or very little labelled data/ground truth for the target domain using unsupervised and semi-supervised machine learning methods. In various embodiments, the image processing models can include artificial intelligence/machine learning (AI/ML) based medical image processing models, such as organ segmentation models, anomaly detection models, image reconstruction models, and the like. The disclosed domain adaptation techniques can also be extended to AI/ML image analysis/processing models configured to perform similar inferencing tasks on non-medical domains.

The disclosed domain adaptation techniques are independent of the trained source domain model and correct the model prediction for an image from a target domain as a post-processing step. In this regard, the disclosed domain adaptation processes address some of the challenges of prior domain adaptation methods as they: (a) can use any pre-trained architecture and adapt it for a new domain; (b) maintain performance of the source domain undisturbed; and (c) provide a plug-and-play architecture where one target domain can be replaced easily by another without affecting the original pre-trained model.

In one or more embodiments, the disclosed domain adaptation techniques involve training a post-processing model to optimize/correct the image-based inference output of the source domain model when applied to images of a different but similar domain, referred to herein as the target domain. The post-processing model can comprise one or more machine learning models that can be trained using unsupervised and/or semi-supervised machine learning methods. For example, in some embodiments, the post-processing model can comprise a shape autoencoder (SAE) consisting of an encoder network and a decoder network. With these embodiments, the input data set for the encoder network can include the output of the source domain model when applied to the target domain image, which generally has some inaccuracies (e.g., an inaccurate segmentation mask, an inaccurate classification, etc.). In some embodiments, the input data set for the encoder network can also include the original target domain image that was processed by the source domain model. The encoder network can be trained to transform the input data set into a latent representation in feature space which is then decoded by the decoder network to generate an optimized output image and/or optimized inference output (e.g., a corrected segmentation mask, a more accurate classification, etc.).

In one or more non-limiting examples, the disclosed domain adaptation approach can be applied to correct organ segmentation masks obtained from a (source) deep neural network (DNN) segmentation model that was trained on images from a source domain and used for prediction on a different target domain. For example, the source model can include an organ segmentation model for a specific organ (e.g., the liver, the heart, the kidneys, etc.) trained on images of the organ captured using a first type of imaging modality, which when used for prediction on images of the same organ captured using a second type of imaging modality, does not perform accurately. The first and second types of imaging modalities can vary so long as they produce similar images with some variances in appearance (e.g., color, saturation, contrast, hue, density, brightness, etc.), field of view (FOV), depth, dimensionality, dosage, demography, or the like. In some implementations, the source domain images can comprise non-contrast CT images and the target domain images can comprise contrast enhanced CT images. In accordance with these embodiments, a second, deep neural network in the form of a SAE can be used to correct the masks from the source domain organ segmentation model after the fact, or to re-tune the source domain segmentation model to produce accurate masks to begin with. The method is agnostic to the trained segmentation model and generic enough to be extended and applied to other domain adaptation use cases.

The post-processing model can be trained using unsupervised and/or semi-supervised machine learning techniques, depending on availability of training data. In this regard, the post-processing model can be trained using ground truth data for the source domain, ground truth data for the target domain, or a combination of both. For example, as applied to non-contrast source domain images and contrast target domain images, the post-processing model can be trained using non-contrast images and predicted masks from the segmentation model (either the full non-contrast data set or part of it). A few representative images and masks (if available) from the contrast data set can also be included in the training set. The number of samples from the contrast dataset to be included in the training data set can depend on the availability of data from such a set (image and ground truth masks) and the desired accuracy of the autoencoder model. In various embodiments, the post-processing model can be tuned with multi-channels inputs such as (but not limited to): 1 predicted mask, 3 consecutive predicted masks, 1 image and 1 predicted mask, 1 image and 3 consecutive predicted masks, and 3 consecutive images and 1 predicted mask.

The above described method is one approach through which image-based inference outputs (e.g., segmentation masks) for the target domain (contrast images) can be corrected using a second trained model (e.g., an SAE) as a post-processing step. The disclosed subject matter further provides another approach for domain adaptation that uses the encoder network of a trained SAE generated using the techniques described above. In accordance with these embodiments, the encoder network can be used in a generative adversarial network (GAN) architecture to re-tune the source domain model for the target domain. For example, as applied to a non-contrast segmentation model, the encoder network can be used in a GAN network architecture to adapt the non-contrast segmentation model for same or enhanced accuracy on contrast images. In this regard, using a GAN framework, the trained shape encoder can be used as a discriminator network to help re-train parameters/weights of the source domain model (i.e., the generator) with an adversarial approach. This shape encoder can also act as a constraint for another feature-based discriminator which then updates the source domain model to match source domain images (e.g., non-contrast images) and the target domain images (e.g., contrast images) in the feature space while imposing the shape constraint for the targeted organ for segmentation. Doing so results in better model convergence through stability of tuning the algorithm with the added shape constraint on the network.

The term "image processing model" is used herein to refer to an AI/ML model configured to perform an image processing or analysis task on images. The image processing or analysis task can vary. In various embodiments, the image processing or analysis task can include, (but is not limited to): a segmentation task, an image reconstruction task, an object recognition task, a motion detection task, a video tracking task, an optical flow task, and the like. The image processing models described herein can include two-dimensional image processing models (2D) as well as three-dimensional (3D) image processing models. The image processing model can employ various types of AI/ML algorithms, including (but not limited to): deep learning models, neural network models, deep neural network models (DNNs), convolutional neural network models (CNNs), and the like.

The term "image-based inference output" is used herein to refer to the determination or prediction that an image processing model is configured to generate. For example, the image-based inference output can include a segmentation mask, a reconstructed image, an adapted image, an annotated image, a classification, a value, or the like. The image-based inference output can vary based on the type of the model and the particular task that the model is configured to perform. The image-based inference output can include a data object that can be rendered (e.g., a visual data object), stored, used as input for another processing task, or the like. The terms "image-based inference output", "inference output" "inference result" "inference", "output", "predication", and the like, are used herein interchangeably unless context warrants particular distinction amongst the terms.

As used herein, a "medical imaging processing model" refers to an image processing model that is tailored to perform an image processing/analysis task on one or more medical images. For example, the medical imaging processing/analysis task can include (but is not limited to): organ segmentation, anomaly detection, anatomical feature characterization, medical image reconstruction, diagnosis, and the like. The types of medical images processed/analyzed by the medical image processing model can include images captured using various types of imaging modalities. For example, the medical images can include (but are not limited to): radiation therapy (RT) images, X-ray images, digital radiography (DX) X-ray images, X-ray angiography (XA) images, panoramic X-ray (PX) images, computerized tomography (CT) images, mammography (MG) images (including a tomosynthesis device), a magnetic resonance imaging (MRI) images, ultrasound (US) images, color flow doppler (CD) images, position emission tomography (PET) images, single-photon emissions computed tomography (SPECT) images, nuclear medicine (NM) images, and the like. The medical images can include two-dimensional (2D) images as well as three-dimensional images (3D).

The terms "source domain model", "source model" "source image processing model", "source domain image processing model" and the like are used herein interchangeably to refer to an imaging processing model trained on images from specific domain, referred to herein as the source domain. Images included in the source domain are referred to herein as "source domain images" or "source images." The terms "target domain model", "target model", "target image processing model", "target domain image processing model", and the like, are used herein interchangeably to refer to an imaging processing model configured to perform a same or similar image processing task as a corresponding source domain model, yet on images from a different but similar domain, referred to herein as the "target domain." Images included in the target domain are referred to herein as "target domain images" or "target images".

In this regard, source domain (SD) images and target domain (TD) images can include similar images that have some consistent variations. These consistent variations can be based on different capture modalities, acquisition protocols, demography, and other factors affecting image quality (IQ) or appearance. In some implementations, the SD image and the TD images comprise images captured of the same object that differ with respect to at least one visual appearance property. In other implementations, the SD image and the TD images comprise medical images of a same anatomical body part (e.g., a same organ), yet differ with respect to capture modality. For example, with respect to radiation therapy (RT) images (e.g., CT scans, MRI scans, etc.), the SD images and the TD images can vary with respect to having or not having contrast injection. The RT images can also vary with respect to different capture voltages. For example, RT images can be captured at varying kilovoltages for different applications, ranging from 70 kilovolts (kVs) to about 140 kVs, which can cause variances in the resulting image quality. In another example, the SD and TD images can include MRI images that vary with respect to sequence intensities.

The term "optimized image-based inference output" is used herein to refer to an image-based inference output that has been adapted or adjusted for a target domain image. In various embodiments, an "optimized image-based inference output" refers to a SD model inference output generated based on a target domain image that has been corrected or adjusted to account for errors attributed to domain variations. The terms "optimized image-based inference output", "optimized inference output" "optimized inference result" "optimized inference", "optimized output", "optimized predication", and the like, are used herein interchangeably unless context warrants particular distinction amongst the terms.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Turning now to the drawings, FIG. 1 illustrates a block diagram of an example, non-limiting system 100 that facilitates domain adaptation of image processing models in accordance with one or more embodiments of the disclosed subject matter. Embodiments of systems described herein can include one or more machine-executable components embodied within one or more machines (e.g., embodied in one or more computer-readable storage media associated with one or more machines). Such components, when executed by the one or more machines (e.g., processors, computers, computing devices, virtual machines, etc.) can cause the one or more machines to perform the operations described.

For example, system 100 includes a domain adaptation module 104 that can include various computer/machine executable components, including training component 106, source domain model 108, post-processing model 110, image processing component 112, source domain model application component 116, and post-processing model application component 120. These computer/machine executable components (and other described herein) can be stored in memory (not shown) associated with the one or more machines (not shown). The memory can further be operatively coupled to at least one processor (not shown), such that the components (e.g., the training component 106, the source domain model 108, the post-processing model 110, the image processing component 112, the source domain model application component 116, the post-processing model application component 120, and other components described herein), can be executed by the at least one processor to perform the operations described. Examples of said and memory and processor as well as other suitable computer or computing-based elements, can be found with reference to FIG. 16, and can be used in connection with implementing one or more of the systems or components shown and described in connection with FIG. 1 or other figures disclosed herein.

The domain adaptation module 104 can facilitate domain adaptation of image processing models from a source domain to a target domain. In the embodiment shown, the source domain model 108 corresponds to the image processing model that is desired to be "adapted" from the source domain to the target domain. The source domain model 108 can include an image processing model trained to perform a specific image processing task on images from a source domain. The image processing task and the source domain can vary. For example, the source domain model 108 can include AI/ML medical image processing model, such as organ segmentation model, an anomaly detection model, an image reconstruction models, and the like. The source domain model 108 can also include AI/ML image analysis/processing model configured to process images in non-medical domains. In one or more non-limiting implementations, the source domain model 108 can comprise an organ segmentation model configured to generate segmentation masks for a specific organ based on one or more images of the organ captured using a specific image capture modality (e.g., non-contrast CT scans). However, it should be appreciated that the disclosed techniques are not limited to this example implementation. For example, in various exemplary embodiments described herein, the source domain model 108 can comprise a liver organ segmentation model configured to generate segmentation masks for non-contrast CT images. When applied to contrast CT images, the resulting segmentation masks are often inaccurate, as demonstrated in FIG. 2.

Figure 2:
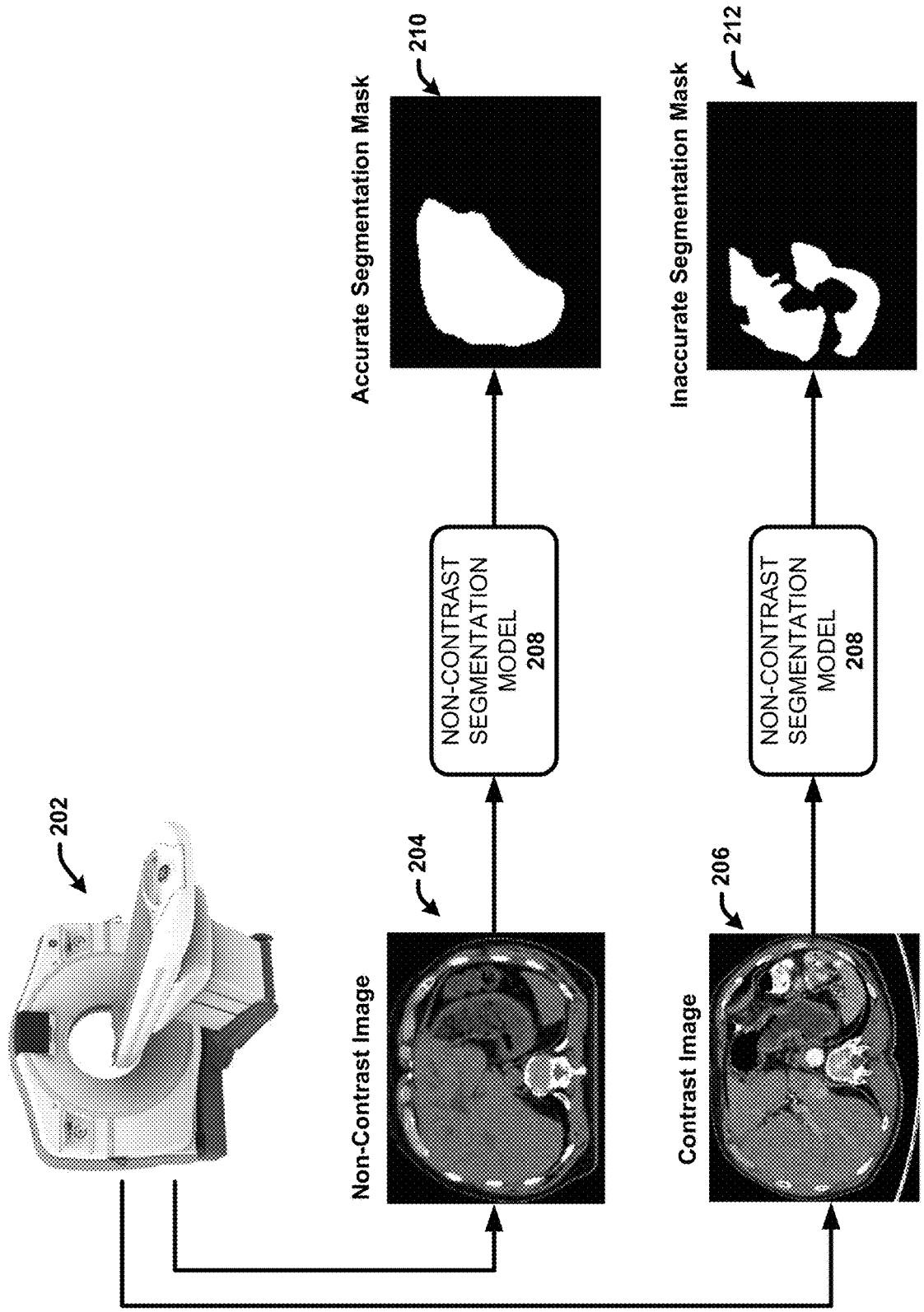
FIG. 2 illustrates an example of performance degradation when applying an organ segmentation model to an image from a different domain relative to its training images.

In this regard, FIG. 2 illustrates an example of performance degradation that results when applying an organ segmentation model to an image from a different domain relative to its training images. In the embodiment shown in FIG. 2, the source domain model comprises a non-contrast segmentation model 208 trained on non-contrast CT images of the liver and configured to generate segmentations masks of the liver. In the embodiment shown, the non-contrast segmentation model 208 comprises a 2D image processing model configured to generate a 2D organ segmentation mask for a 2D input image. For example, the non-contrast segmentation model 208 can employ a combination of a 2D convolutional neural network (CNN) with residual connections and 2D diluted residual network (DRN) network layers. In other embodiments, the non-contrast segmentation model 208 can be a three-dimensional segmentation model configured to generate volumetric segmentation mask for a 3D input image, as described in greater detail infra with reference to FIGS. 9A and 9B.

In accordance with the example shown in FIG. 2, a CT scanner 202 was used to generate CT scan images of a patient's liver without contrast (e.g., non-contrast image 204) as well as CT scans of the patient's liver with contrast (e.g., contrast image 206). When a non-contrast image 204 is received as input to the non-contrast segmentation model 208 that has been trained on non-contrast images, the resulting segmentation mask 210 accurately segments the liver as depicted in the non-contrast image 204. However, when a contrast image 206 is received as input, the non-contrast segmentation model 208 generates an inaccurate segmentation mask 212 of the liver appearing in the contrast image 206. For example, when compared to the resulting segmentation mask 210 for the non-contrast image, the inaccurate segmentation mask 212 for the contrast image 206 include holes or gaps over portions of the liver.

With reference again to FIG. 1, the domain adaptation module 104 can facilitate domain adaptation, that is repurposing/re-using the source domain model 108 for a new target domain, using a post-processing model 110. In particular, the domain adaptation module 104 can employ a post-processing domain adaptation architecture that preserves the integrity of the source domain model 108, leaving the source domain model unchanged. The domain adaptation module 104 rather trains a post-processing model 110 to adapt or correct the output of the source domain model 108 to account for variations between the source domain input and the target domain input. In this regard, the domain adaptation module 104 provides domain adaptation techniques that are independent of the (trained) source domain model 108 and corrects the source domain model prediction for an image from a target domain as a post-processing step.

To facilitate this end, the domain adaptation module 104 can comprise a training component 106 that facilitates training a post-processing model 110 to correct an image-based inference output of the source domain model 108 that results from application of the source domain model 108 to a target image from a target domain that differs from a source domain, wherein the source domain model 108 was trained on source images from the source domain. The target domain images can include images that are similar to the source domain images yet have some consistent variations that can affect the performance accuracy and/or specificity the source domain model 108. For example, the source domain images and the target domain images can comprise images of a same object that differ with respect one or more visual appearance properties, such as resolution, coloration, brightness, contrast, FOV, temperature, etc. In another non-limiting example, the source images and the target images can comprise medical images of a same type of body part captured yet differ with respect to capture modality, capture protocol, diagnosis, patient dependent variations (e.g., in demographic based features, medical history based features, anatomical features, etc.). In one or more exemplary embodiments, the source images and the target images comprise CT scans that differ with respect to having or not having contrast.

In various embodiments, the post-processing model 110 includes a shape autoencoder (SAE) consisting of an encoder network and a decoder network. With these embodiments, the encoder network can be trained to transform the output of the source domain model 108 (referred to as the SD model inference output 118), and optionally the original input image to the source domain model 108, into a latent representation in feature space which is then decoded by the decoder network to generate the optimized inference output 122 (e.g., a corrected segmentation mask). Additional details regarding the operations of the post-processing model 110 as an SAE are described infra with reference to FIG. 3.

The post-processing model 110 however is not limited to an SAE. In this regard, various other types of machine learning models can be used for the post-processing model 110 and trained to correct the output of the source domain model 108. For example, the post processing model can include various other types of network models, DNNs, CNNs, GANs, and combinations thereof. Other suitable machine learning models that can be used for the post-processing model 110 can include (but are not limited to): nearest neighbor (NN) models (e.g., k-NN models, replicator NN models, etc.), statistical models (e.g., Bayesian networks, etc.), clustering models (e.g., k-means, etc.), neural networks (e.g., reservoir networks, artificial neural networks, etc.), support vector machines (SVMs), and combinations thereof.

In some implementations, the training component 106 can train and/or facilitate training the post-processing model 110 using an unsupervised machine learning process without ground truth training data for the target domain. With these embodiments, the training data 102 can include source domain data with ground truth examples for the source domain and unlabeled target domain images and/or unlabeled source domain images. For instance, in implementations in which the source domain model comprises a segmentation model configured to generate segmentation masks, the ground truth examples for the source domain training data can include source domain images and corresponding accurate segmentation masks for those source domain images generated by the source domain model 108.

Additionally, or alternatively, the training component 106 can train or facilitate training the post-processing model 110 using a semi-supervised machine learning process with at least some ground truth training data for the target domain. With these embodiments, the training data 102 can include target domain data with ground truth examples for the target domain and unlabeled target domain images and/or unlabeled source domain images. For instance, in implementations in which the source domain model comprises a segmentation model configured to generate segmentation masks, the ground truth examples for the target domain training data can include target domain images and corresponding accurate segmentation masks or regions for those target domain images that have been manually annotated in the target domain images or otherwise generated or marked using an alternative automated method. The semi-supervised machine learning process can also include a combination of the above described training data for the source domain and the target domain, including ground truth examples for both. Additional details regarding the training of the post-processing model 110 are described infra with reference to FIG. 3 and FIG. 4.

After the post-processing model 110 has been trained the image processing component 112 can employ the source domain model 108 and the post-processing model 110 to generate optimized inference outputs for new target domain images (i.e., target domain images 114 that were unseen during training of the post-processing model 110). To facilitate this end, the image processing component 112 can include source domain model application component 116 and post-processing model application component 120. In this regard, the source domain model application component 116 can receive one or more target domain images 114 as input and apply the source domain model 108 to the one or more target domain images to generate one or more SD model inference outputs 118. The post-processing model application component 120 can further apply the (trained) post-processing model 110 to the one or more SD model inference outputs 118 (and optionally one or more of the target domain images 114) to generate an optimized inference output 122 (e.g., a corrected segmentation mask).

For example, with reference again to FIG. 2 in view of FIG. 1, in implementations in which the target domain images comprise contrast CT scans and the source domain model 108 comprises a non-contrast segmentation model 208, the source domain model application component 116 can apply the source domain model 108 to one or more contrast CT scans (e.g., contrast image 206) to generate one or more inaccurate segmentation masks (e.g., inaccurate segmentation mask 212). The post-processing model application component 120 can further apply the post-processing model 110 to the one or more inaccurate segmentation masks (e.g., inaccurate segmentation mask 212) to generate a corrected segmentation mask for the contrast image 206. In some implementations, the post-processing model application component 120 can also apply at least one of the target domain images 114 as input to the post-processing model 110 in addition to the one or more SD model inference outputs 118 to facilitate generating the optimized inference output 122.

Figure 3:
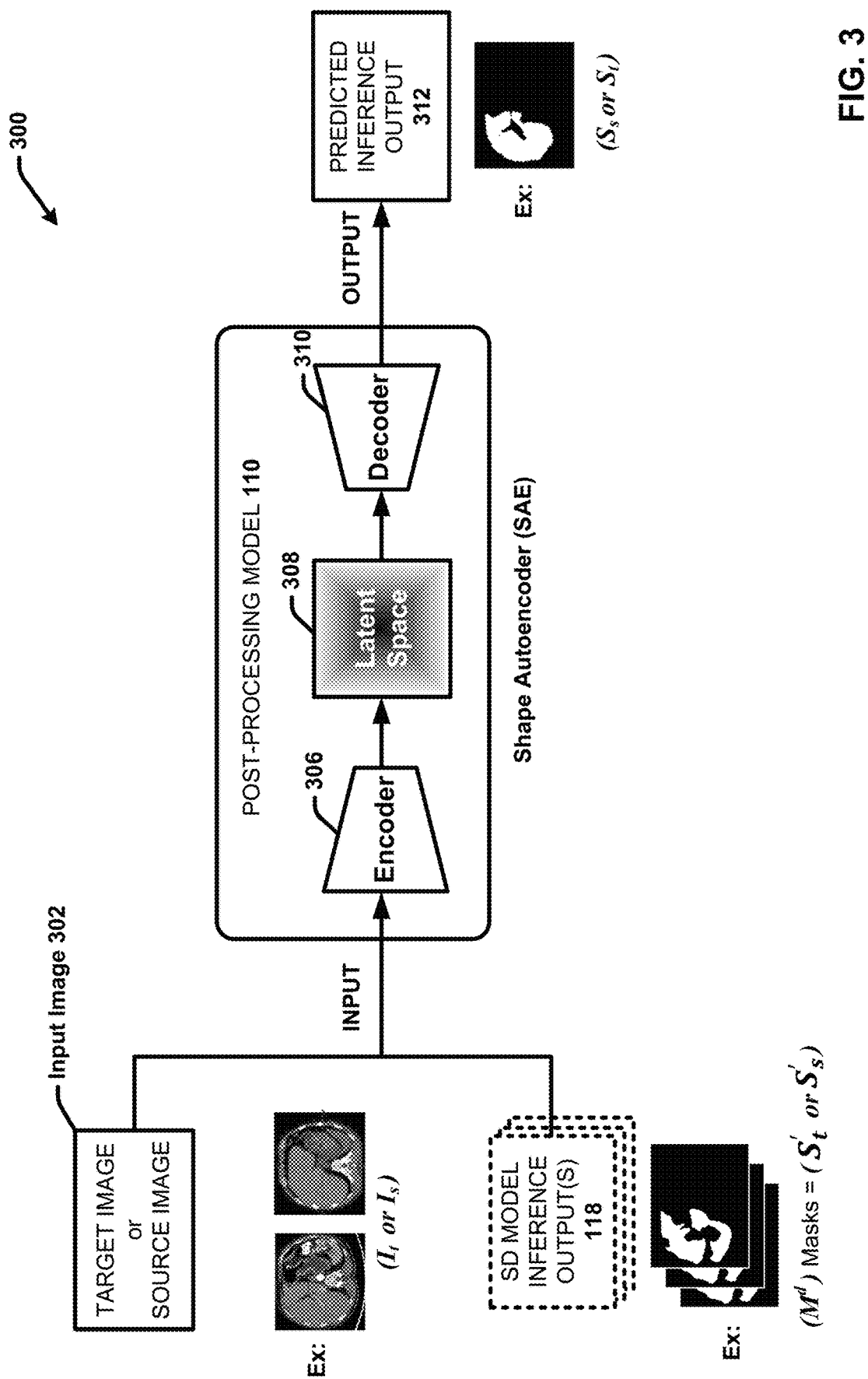
FIG. 3 presents a high-level flow diagram of an example process for training a shape autoencoder (SAE) to be used for domain adaptation in accordance with one or more embodiments of the disclosed subject matter.

FIG. 3 presents a high-level flow diagram of an example process 300 for training a shape autoencoder (SAE) to be used for domain adaptation in accordance with one or more embodiments of the disclosed subject matter.

In one or more embodiments, the post-processing model 110 comprises a fully connected network (a SAE) including an encoder network 306, latent space 308 and a decoder network 310, wherein the encoder network 306 and the decoder network 310 are parameterized by a set of parameters θ.

The input data set for encoder network 306 can include one or more SD model inference outputs 118 (e.g., one or more segmentation masks) and (optionally) an original input image 302 that was input into the source domain model 108 and used to generate at least one of the one or more SD model inference outputs 118. The encoder network 306 comprises a mapping network that transforms the input data set into a hidden representation in latent space 308. The encoder network 306 can comprise successive nonlinearities, pooling and convolutional layers, with a final fully connected layer that concentrates all input information into a low dimensional code representation. This code representation is then feed into the decoder network 310, which maps the code representation to a predicted inference output 312 through a series of up-convolutions and non-linearities. The predicted inference output 312 corresponds to a corrected or optimized version of the one or more SD model inference outputs 118 for the target domain, which in this example us-case is a corrected segmentation mask. A corrected segmentation mask for a target image input is denoted as $S_t$ and a corrected segmentation mask for a source image input is denoted as $S_s$.

In this regard, in various embodiments, the one or more SD model inference outputs 118 can comprise a series of segmentation masks that are generated based on application of a non-contrast segmentation model to a series of input images, and the predicted inference output 312 can correspond to a single corrected segmentation mask for the input images. In particular, two or more consecutively captured images of the same object or scene can be used as input to the source domain model 108 (denoted herein as $M^d$) and used to generate one or more SD model inference outputs 118. As applied to medical imaging, three consecutive image scans captured of an organ can be used that provide slightly different perspectives of the organ (e.g., consecutive CT scan slices, consecutive MRI scan slices, etc.). In accordance with this example, the source domain model 108 can be configured to generate three separate SD model inference outputs 118, one for each scan. For example, in implementations in which the source domain model 108 is an organ segmentation model, the organ segmentation model can be fed three consecutive scans as input and generate three corresponding segmentation masks. These three resulting segmentations masks provide the SAE context regarding how the previous and next segmentation masks look like. In accordance with this embodiment, the post-processing model 110 can be configured to then generate a corrected segmentation mask for the middle image using context information extracted from the previous and following segmentation masks. The middle slice (e.g., the middle image) can also be used as input to the SAE to provide additional context information. In accordance with these embodiments, the input image 302 can be or correspond to the middle image. For example, by providing the middle slice (or the single original input image used to generate a corresponding segmentation mask) into the post-processing model 110 in addition to the generated segmentation mask or masks, this provides the post-processing model 110 with context information regarding the neighboring organs and anatomical features as well as the distribution of the intensities and the context of the anatomy of the organ for which the corrected segmentation mask is to be generated.

As shown in FIG. 3, during model training, depending on the ground truth training data available, the input image 302 can include a target image denoted herein as $I_t$ (e.g., from the target domain) or a source image denoted herein as $I_s$ (e.g., from the source domain). For example, in accordance with the non-contrast and contrast image example embodiments, the input image 302 can comprise a contrast image (a target domain image) or a non-contrast image (a source domain image). When the input image that is fed into the source domain model 108 is a target image, the resulting SD model inference output 118 (e.g., a segmentation mask) is denoted herein as $S'_t$. When the input image is a source domain image, the resulting SD model inference output (e.g., a segmentation mask) is denoted herein as $S'_s$.

In various embodiments, the following formulation can be used for the subject domain adaptation solution, using segmentation masks as the example SD model inference outputs 118. In accordance with this formulation the central part of the post-processing model 110 is the fully connected network of the encoder network 306 and the decoder network 310, where the decoder network 310 and the encoder, are parameterized by a set of parameters θ. Given source domain images and segmentation masks $\{I_k^s, S_k^s\}$, k=1, 2, ..., N we assume the source domain model 108 $M^d$ has been trained to give masks $S_s'=\Psi(I_s)$, given an image $I_s$ from the source domain and $\Psi$ denotes the network transform. The target domain image $I_t$ passed through the same network produces a segmentation mask $S_t'=\Psi(I_t)$, which is non-optimal. The SAE can be trained (e.g., by the training component 106) using a loss function optimization structure for optimization of the segmentation mask structure/shape in either an unsupervised learning framework or a semi-supervised learning framework.

The unsupervised learning framework can be used to train the post-processing model 110 when no ground truth examples for the target domain data set are available (e.g., ground truth segmentation masks for the target domain images). When no target domain exemplars are available, the autoencoder learning relies solely on few images and ground truth pairs from the source domain $\{I_s^k, S_k^k\}$, k={1, 2, ... N}. The model for the autoencoder learns such that, $\theta_s$: (EoD)($I_s$, $S'_s$)→$S_s$, minimizes training losses $$J(\theta) = \sum_{k=1}^{N} \mathcal{L}(S_s^k, \hat{S}_s^k)$$

where the loss can be defined using a dual loss described below, and $S_s'=\Psi(I_s)$ being the output of pre-trained segmentation model $M^d$.

The semi-supervised learning framework can be used to train the post-processing model 110 when at least some ground truth examples for the target domain data set are available (e.g., ground truth segmentation masks for the target domain images). In this regard, when the target domain has some exemplar images with ground truth pairs $\{I_t^k, S_t^k\}$, k={1, 2, ... N}, then the autoencoder learns parameters $\theta_t$: (EoD)($I_t$, $S'_t$)→$S_t$, with similar loss as unsupervised learning and includes few target domain images and masks. $S_t'=\Psi(I_t)$ is the output of target domain images using the pre-trained segmentation net $M^d$.

In accordance with the semi-supervised and the unsupervised learning methods, the SAE can be trained to generate the predicted inference output 312 by minimizing losses with the corresponding ground truth masks at the network output. For example, as applied to an image segmentation problem such as organ segmentation or the like, for training using the dual loss, the SAE can have two outputs: a segmentation mask and signed distance map (SDM) of the segmentation mask. The segmentation mask loss can be measured using the Dice coefficient (DC) loss. The SDM can be measured using a combination of L, as defined by Equation 1, and the product loss, $L_{product}$, as defined by Equation 2 as follows:

$$L = L_{Dice} + \alpha(L_1 + L_{product}) \quad \text{Equation 1.}$$

$$L_{product} = -\sum \frac{y_{true} y_{pred}}{(y_{true} y_{pred} + y_{true}^2 + y_{pred}^2)}. \quad \text{Equation 2}$$

In accordance with Equation 1 and Equation 2 above, $y_{true}$ is the SDM of the ground truth segmentation mask and $y_{pred}$ is the SAE model predicted SDM. The product loss $L_{product}$ results in more stable training and penalizes predicted SDM for wrong sign, while providing smoother gradient information in combination with the L loss. Moreover, in combination with the Dice loss, the product loss $L_{product}$ focuses the training on boundary of the object of interest (e.g., an organ of interest as applied to organ segmentation) and aims to preserve the object shape. In some implementations, the training component 106 can also train the SAE by minimizing binary-cross-entropy (BCE) losses with the corresponding ground truth masks at the network output.

In this regard, as applied to the domain adaptation problem of a liver segmentation model trained on non-contrast CT images which when used for prediction of liver masks for contrast enhanced CT images does not perform accurately, the SAE model can be trained using the non-contrast images and predicted masks from the segmentation model (either the full non-contrast data set or part of it). A few representative images and masks (if available) from the contrast data set can also be included in the training set of the SAE. The number of samples from contrast dataset to be included in the train set can depend on the availability of data from such a set (image and ground truth mask) and the desired accuracy of the SAE. In this regard, it should be appreciated that the number of ground truth training samples from the target domain and the source domain can vary based on availability of data and the desired performance accuracy of the SAE.

Here unsupervised training refers to the SAE not seeing the target domain exams and ground truth pairs, and thus is trained with the source domain pairs. In this regard, the training component 106 trains the SAE using exemplars from the non-contrast exams, their corresponding predicted masks from the segmentation model $M^d$ and the ground truth $S_s^k$, with dice coefficient and binary cross entropy functions. In accordance with one example implementation, the SAE can include 11 layers of 2D CNNs with batch normalization. Semi-supervised training in accordance with this example implementation can be accomplished by integrating a few representative contrast-enhanced exams and their output from $M^d$ in the input channel. The SAE can thus be trained by minimizing dice DC, SDM and/or BCE losses with the corresponding ground truth masks at the network output.

The training component 106 can employ multiple variations of input channel combinations for input image and predicted outputs (e.g., segmentation masks) for training the SAE while minimizing the DC, SDM and/or BCE losses. For example, the SAE can be tuned with multi-channels inputs such as (but not limited to): 1 predicted mask slice, 3 consecutive predicted mask slices, 1 image and 1 predicted mask slice, 1 image and 3 consecutive predicted mask slices, and 3 consecutive images and 1 predicted mask slice.

Figure 4:
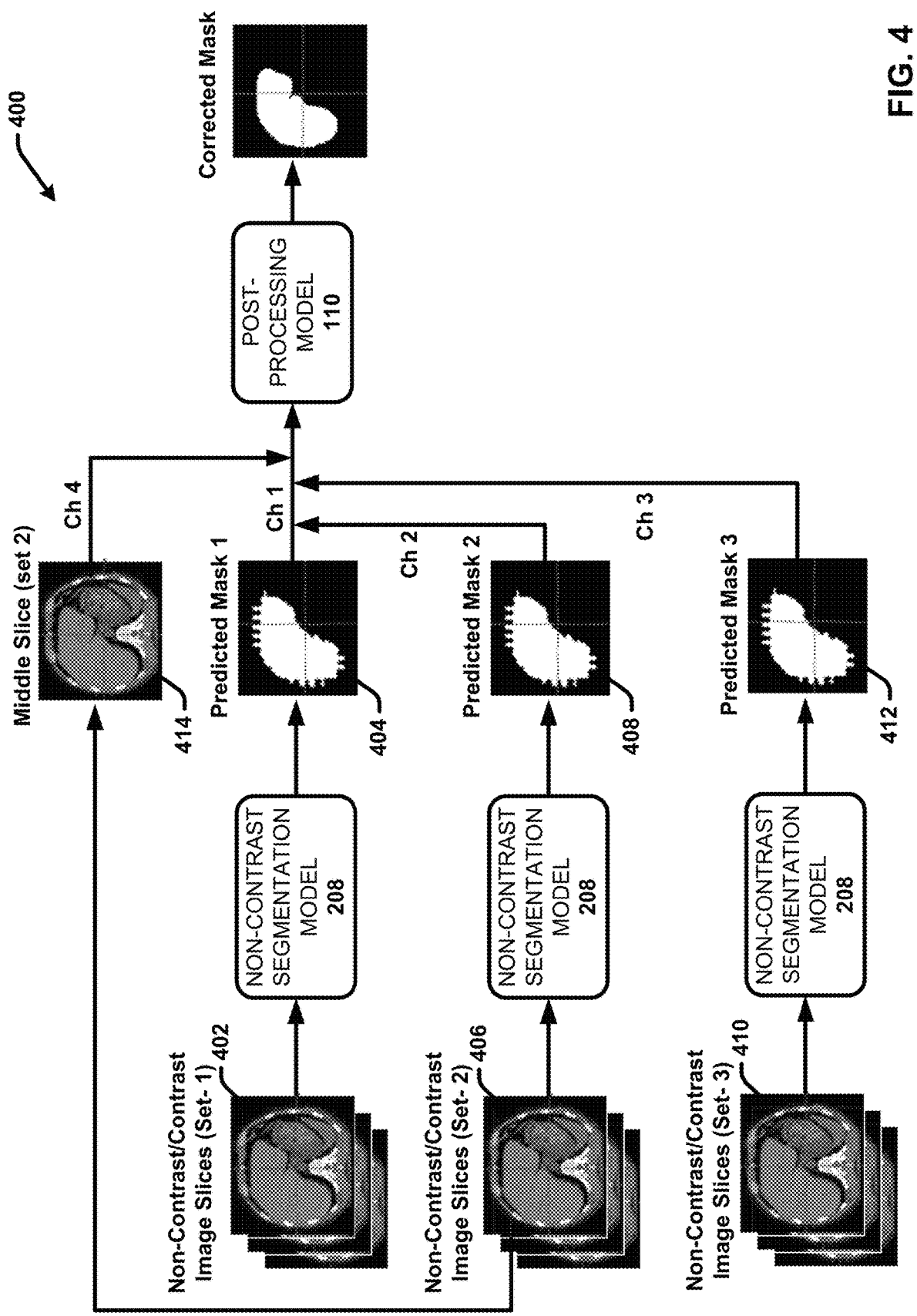
FIG. 4 presents a multi-channel architecture for training a post-processing model to be used for domain adaptation in accordance with one or more embodiments of the disclosed subject matter.

FIG. 4 presents a multi-channel architecture 400 for training the post-processing model 110 to be used for domain adaptation of an organ segmentation model in accordance with one or more embodiments of the disclosed subject matter. In the embodiment shown, the source domain model 108 used comprises the non-contrast segmentation model 208. The post-processing model 110 can comprise the SAE described above.

The multi-channel architecture 400 illustrates up to a four-channel input scheme for training the post-processing model as exemplified when applied to correct segmentation masks for contrast images generated by a non-contrast segmentation model 208 that was trained on non-contrast images. As discussed above, the input images used for training can include non-contrast images (i.e., source domain images) and/or contrast images (i.e., target domain images). In the embodiment shown, a single channel (Ch1) input can include a first segmentation mask 404 generated by the non-contrast segmentation model 208 based on a first set of input images 402. A two-channel input (Ch2) can add second segmentation mask 408 generated by the non-contrast segmentation model 208 based on a second set of input images 406. A three-channel input (Ch3) can add a third segmentation mask 412 generated by the non-contrast segmentation model 208 based on a third set of input images 410. A four-channel input (Ch4) can add an input image 414 that is a middle slice of the second set of input images 406.

Figure 5:
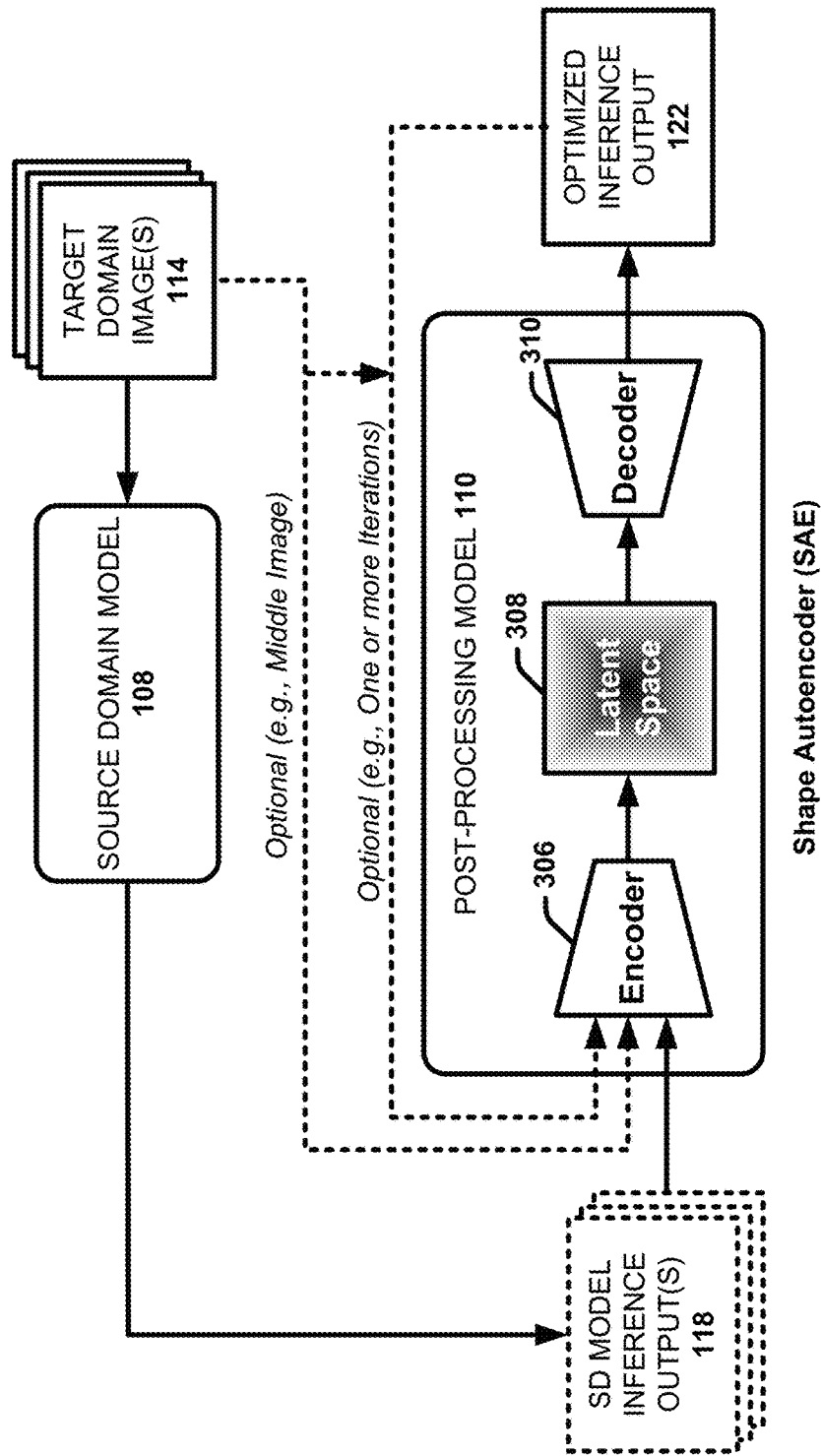
FIG. 5 presents a high-level framework for using a source domain model and a post-processing model to optimize the output of the source domain model for a target domain, in accordance with one or more embodiments of the disclosed subject matter.

FIG. 5 presents a high-level framework 500 for using a source domain model 108 and a post-processing model 110 to optimize the output of the source domain model for a target domain, in accordance with one or more embodiments of the disclosed subject matter. In various embodiments, the image processing component 112 can apply framework 500 to generate an optimized inference output 122 for one or more target domain images 114 using the original (unchanged) source domain model 108 and the (trained) post-processing model 110. In the embodiment shown, the post-processing model 110 comprises the above described SAE after it has been trained. However, it should be appreciated that various other types of machine learning models can be used for the post-processing model 110.

With reference to FIGS. 1 and 5, after the post-processing model 110 has been trained as described above, the post-processing model application component 120 can use it to generate an optimized inference output 122 based on one or more SD model inference outputs 118 (e.g., one or more segmentation masks) and optionally one or more of the target domain images 114. In this regard, the source domain model application component 116 can apply the source domain model 108 to one or more target domain images 114 to generate one or more SD model inference outputs 118 (e.g., one or more inaccurate segmentation masks). The post-processing model application component 120 can then uses the one or more SD model inference outputs 118, and optionally at least one of the target domain images 114, as input into the post-processing model 110 to generate the optimized inference output 122.

In this regard, in some implementations, the (trained) post-processing model 110 can comprise a single channel input model that receives as input, a single SD model inference output (e.g., an inaccurate segmentation mask) generated based on application of the source domain model 108 to one or more target domain images 114, and generates an optimized inference output 122 as a result (e.g., a corrected segmentation mask). Additionally, or alternatively, the post-processing model 110 can comprise a multi-channel input model that receives two or more SD model inference outputs 118 (e.g., inaccurate segmentation masks) generated based on application of the source domain model 108 to two or more related target domain images, and generates an optimized inference output 122 as a result (e.g., a corrected segmentation mask). The two or more related target domain images in this case can include images that provide slightly different perspectives of the same object or scene. For example, the two or more related images can comprise two or more consecutively captured images of the same object, such as two or more consecutive CT or MRI scan images, or the like.

In some implementations of either of these embodiments, the post-processing model can also receive at least one of the target domain images 114 as input. For example, in one implementation in which the target domain images 114 applied as input to the source domain model 108 comprise three consecutive medical image scan slices (e.g., CT scan slices, MRI scan slices, etc.), the middle image of these three slices can be applied as input to the post-processing model 110 along with the one or more (inaccurate) segmentation masks generated based on the three slices. In addition, in some embodiments, the optimized inference output 122 can be fed back through the post-processing model 110 in one or more iterations to further enhance the accuracy of the final output until convergence is reached. With these embodiments, the at least one target image used to generate the one or more original SD model inference outputs can also be fed back through the post-processing model 110 with the optimized inference output 122 (e.g., in implementations in which the post-processing model 110 uses the target image as an input channel).

Figure 6:
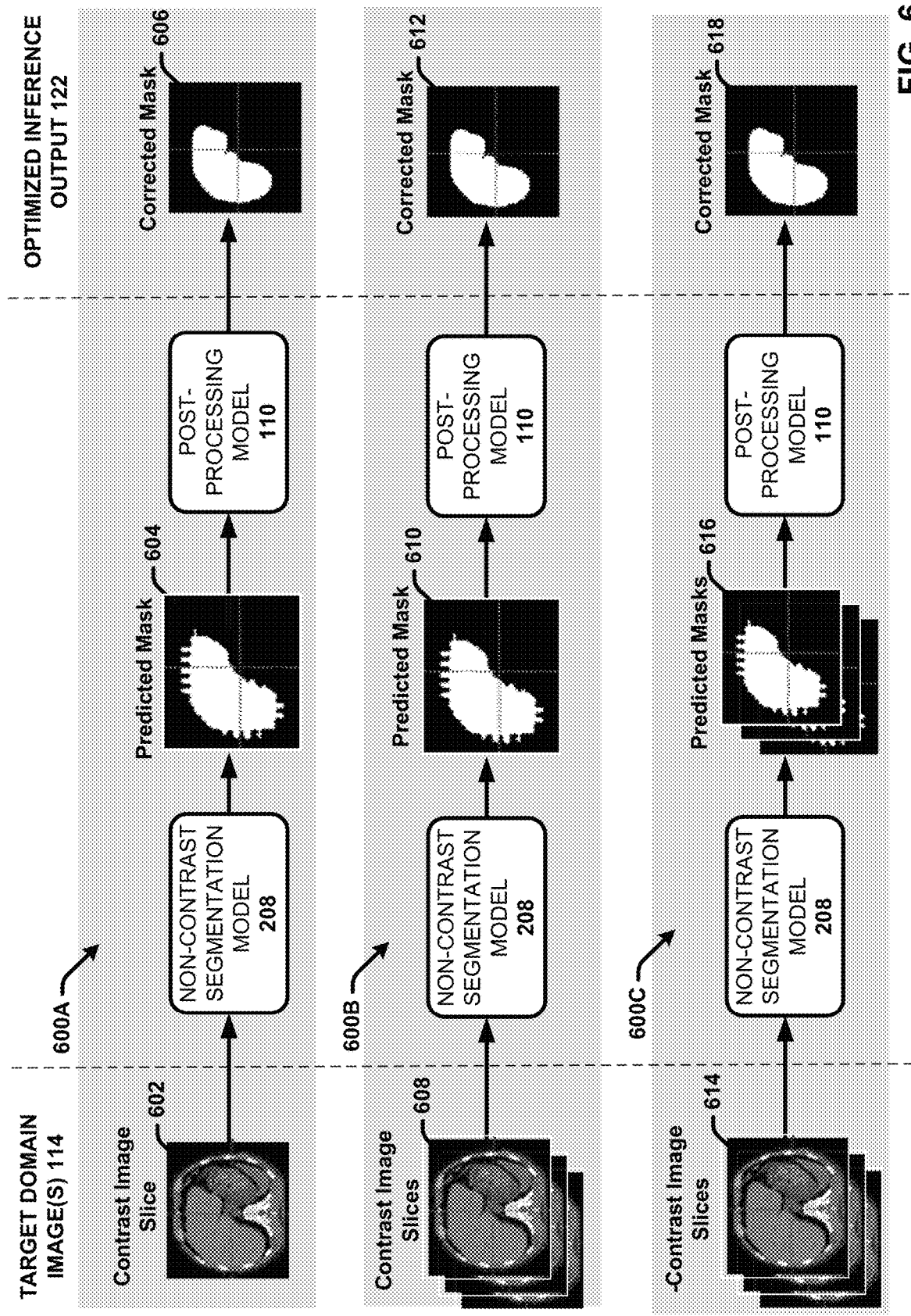
FIG. 6 presents example processes that involve single and multi-channel input and output flows without using a target domain image as input to the post-processing model, in accordance with one or more embodiments of the disclosed subject matter.
Figure 7A:
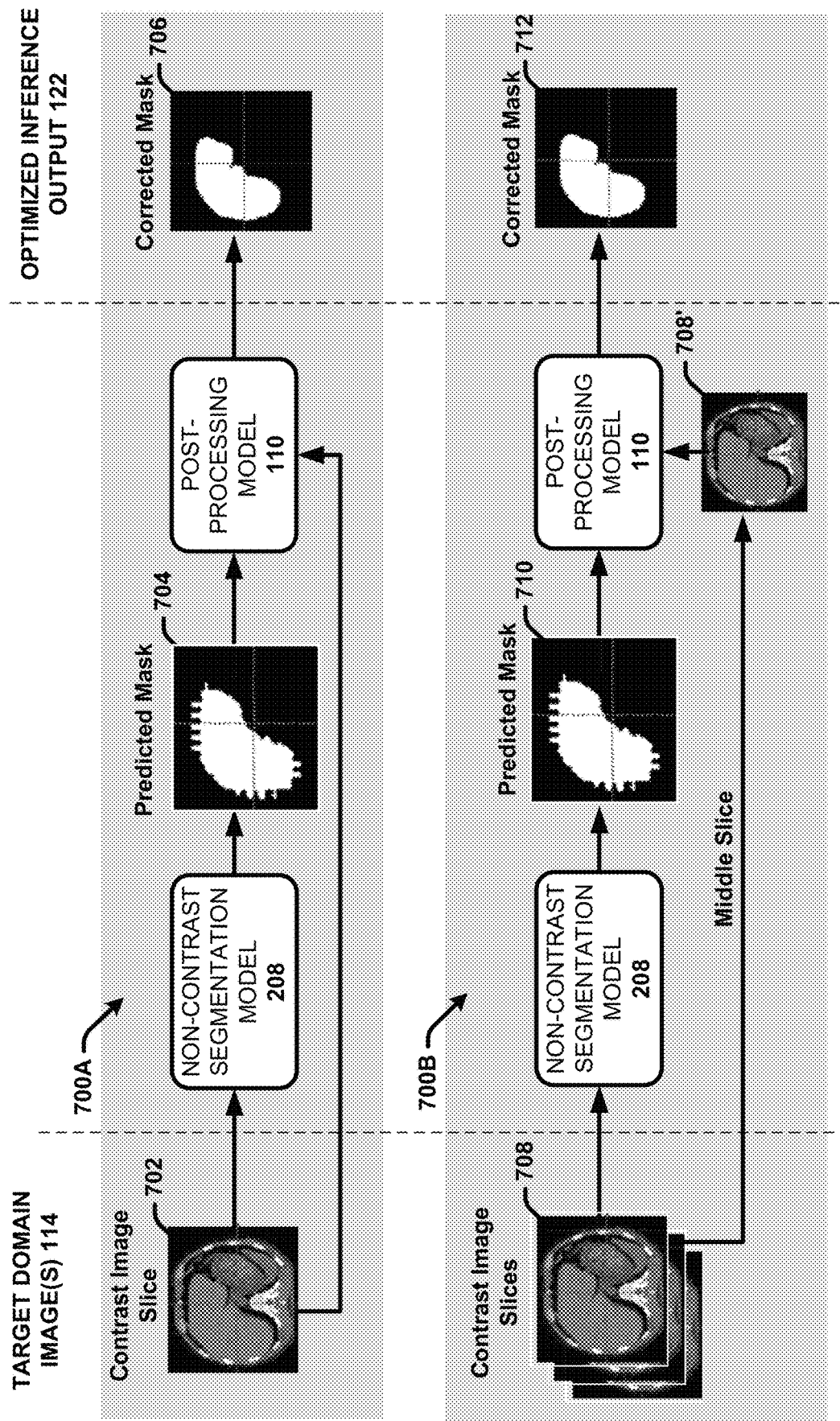

FIGS. 6, 7A and 7B present some example input and output flows for the source domain model 108 and the (trained) post-processing model 110 using different input and output channel options, starting with one or more target domain images 114 and resulting in an optimized inference output 122. The processes shown in FIGS. 6, 7A and 7B demonstrate using a post-processing model 110 that is trained to correct segmentation masks for contrast images of the liver generated by a non-contrast segmentation model 208. However, it should be appreciated that these processes can be applied to different types of image processing models (for both the source domain model and the post-processing model) configured to process different types of source domain images and target domain images.

With reference to FIG. 6, presented are example processes that involve single and multi-channel input and output flows without using a target domain image as input to the post-processing model 110.

Process 600A demonstrates a single input channel for both the non-contrast segmentation model 208 and the post-processing model 110. In accordance with process 600A, the input image 602 for the non-contrast segmentation model 208 comprises a single contrast image of the liver. The output of the non-contrast segmentation model 208 comprises a single predicted mask 604 which is used as input to the post-processing model 110 to generate a corrected mask 606 as the optimized inference output 122. The corrected mask 606 is a corrected version of the predicted mask 604.

Process 600B demonstrates a multi-input channel for the non-contrast segmentation model 208 and single input-channel for the post-processing model 110. In accordance with process 600B, the input images 608 for the non-contrast segmentation model 208 comprise three consecutive contrast images of the liver. The output of the non-contrast segmentation model 208 comprises a single predicted mask 610. In accordance with this example, the non-contrast segmentation model 208 can be configured to generate a single segmentation mask for the middle image using features of the previous and following images for context. The single predicted mask 610 is then used as input to the post-processing model 110 to generate a corrected mask 612 as the optimized inference output 122. The corrected mask 612 is a corrected version of the predicted mask 610.

Process 600C demonstrates a multi-input channel for both the non-contrast segmentation model 208 and the post-processing model 110. In accordance with process 600C, the input images 614 for the non-contrast segmentation model 208 comprise three consecutive contrast images of the liver. The output of the non-contrast segmentation model 208 comprises three predicted masks 616, one for each of the input images. The three predicted masks 616 are then used as input to the post-processing model 110, wherein the post-processing model generates a single corrected mask 618 for the middle predicted mask of the predicted masks 616, using features of the previous and following masks for context.

FIGS. 7A and 7B presents example processes that involve single and multi-channel input and output flows with at least one of the target domain images as input to the post-processing model 110.

Process 700A is similar to process 600A with the addition of the target domain image as input to the post-processing model 110. In accordance with process 700A, the input image 702 for the non-contrast segmentation model 208 comprises a single contrast image of the liver. The output of the non-contrast segmentation model 208 comprises a single predicted mask 704. Both the predicted mask 704 and the input image 702 are then used as input to the post-processing model 110 to generate a corrected mask 706 as the optimized inference output 122. The corrected mask 706 is a corrected version of the predicted mask 704.

Process 700B is similar to process 600B with the addition of the middle slice 708' of input images 708 into the post-processing model 110. In accordance with process 700B, the input images 708 for the non-contrast segmentation model 208 comprise three consecutive contrast images of the liver. The output of the non-contrast segmentation model 208 comprises a single predicted mask 710. The predicted mask 710 and the middle slice 708' are then used as input to the post-processing model 110 to generate a corrected mask 712 as the optimized inference output 122. The corrected mask 712 is a corrected version of the predicted mask 710.

Process 700C is similar to process 600C with the addition of the middle slice 714' of input images 714 into the post-processing model 110. In accordance with process 700C, the input images 714 for the non-contrast segmentation model 208 comprise three consecutive contrast images of the liver. The output of the non-contrast segmentation model 208 comprises three predicted masks 716, one for each of the input images. The three predicted masks 716 and the middle slice 714' are then used as input to the post-processing model 110, wherein the post-processing model generates a single corrected mask 718 for the middle predicted mask of the predicted masks 716, using features of the middle slice 714' and the previous and following masks for context. Process 700C demonstrates a four-channel input for the post-processing model 110.

Process 700D demonstrates re-running the optimized inference output 122 back through the post-processing model 110 to further refine optimized inference output. In this regard, process 700D is a continuation of process 700C. In accordance with process 700D, the corrected mask 718 and the middle slice 714 can be fed back into the post-processing model 110 to generate an even more refined corrected mask 720. This re-running of the optimized inference output 122 (and the corresponding reference input image) can be repeated multiple times until convergence is reached (e.g., until additional improvement in the output is no longer observed).

Figure 8:
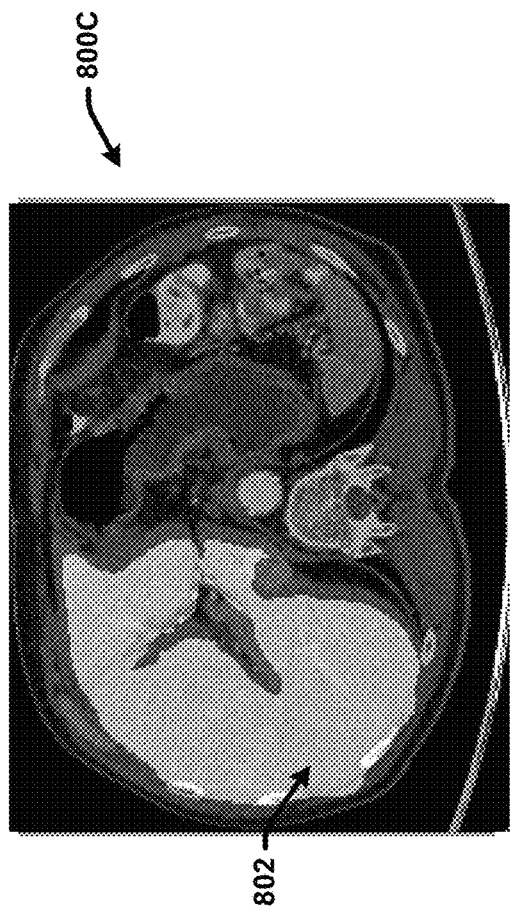
FIG. 8 presents enlarged input and output images of an example contrast CT liver scan in accordance with one or more embodiments of the disclosed subject matter.
Figure 8:
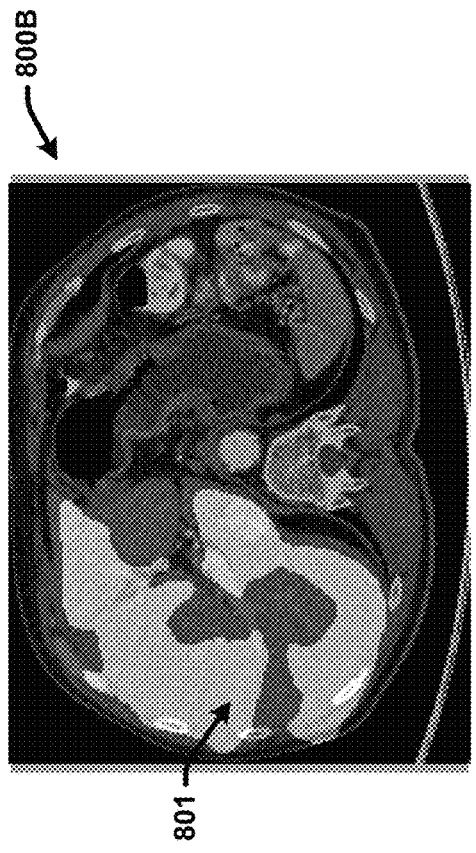
Figure 8:
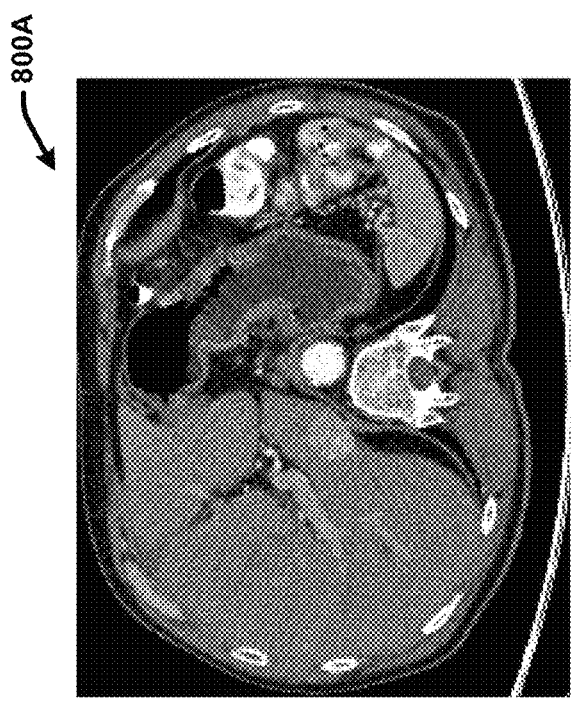

FIG. 8 presents enlarged input and output images of an example contrast CT liver scan in accordance with one or more embodiments of the disclosed subject matter. In particular, image 800A presents an example contrast CT image of the liver prior to image processing through the non-contrast segmentation model 208 or the post-processing model 110. Image 800B presents an example corrected segmentation mask 802 for the liver generated based on running the image 800A through the non-contrast segmentation model 208 in accordance with process 700C. In this regard, the segmentation mask 801 corresponds to the middle predicted mask generated for image 800A in an example workflow in which image 800A was a middle slice of three consecutive slices that were run through the non-contrast segmentation model 208. Image 808C presents an example corrected segmentation mask 802 for the liver generated in accordance with process 700C. As can be seen by comparison of segmentation mask 801 and corrected segmentation mask 802, the disclosed post-processing domain adaptation techniques can significantly improve the results of source domain model predictions when applied to target domain images.

Figure 9A:
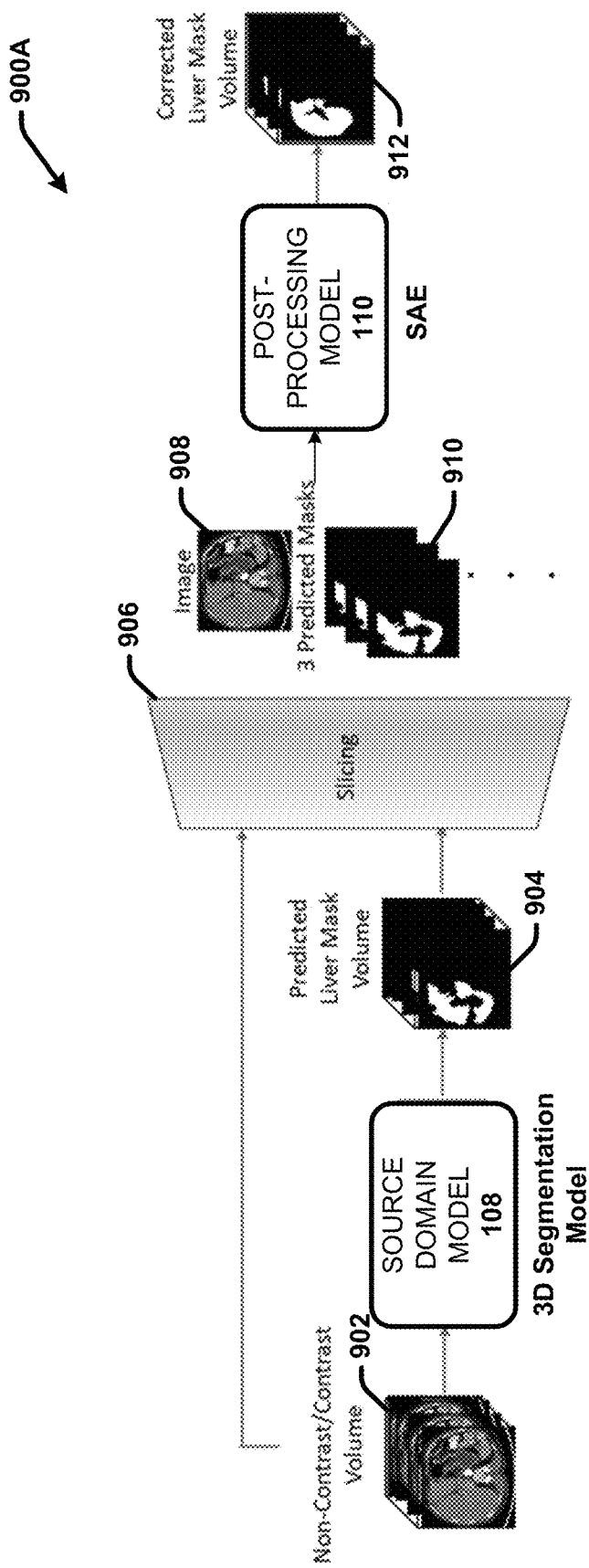
FIG. 9A presents an example post-processing domain adaptation method for prediction and correction of three-dimensional (3D) segmentation masks in accordance with one or more embodiments.

FIG. 9A presents an example post-processing domain adaptation process 900A for prediction and correction of three-dimensional (3D) segmentation masks in accordance with one or more embodiments. In the example implementations applied to organ segmentation described above, the source domain model comprised a 2D segmentation model configured to process 2D images. Process 900A demonstrates how the disclosed techniques can also be used to process 3D images.

In accordance with process 900A, the source domain model 108 can comprise a 3D segmentation model configured to generate a predicted segmentation mask for a 3D volume. In this regard, the input to the source domain model 108 can comprise a 3D image 902 of an object, such as a 3D volume model/representation of the liver generated based on a plurality of consecutive CT scans, MRI scans or the like. The number of image slices used to generate the 3D volume representation and the 3D modeling techniques used to generate the 3D image 902 can vary. When process 900A is applied to train the post-processing model 110, the 3D input image 902 can include a source domain 3D image (e.g., a non-contrast 3D image) or a target domain image 3D image (e.g., a contrast 3D image) in accordance with the unsupervised and semi-supervised training processes described above. However, after the post-processing model 110 has been trained, the 3D input image 902 would be an unseen 3D image (e.g., a 3D volume model/representation) from the target domain.

As applied to a 3D image 902, the source domain model 108 can comprise a 3D segmentation model that generates a 3D volume predicted mask 904 for the corresponding 3D image 902. At 906, the 3D volume predicted mask 904 can then be sliced into a plurality of consecutive 2D segmentation masks 910. The number 2D segmentation masks 910 generated from the 3D volume predicted mask 904 can vary. In some implementations, the number 2D segmentation masks 910 can be the same as the number of image slices used to generate the 3D image 902. In other implementations, the number 2D segmentation masks 910 can be less or more than the number of image slices used to generate the 3D image 902. In another implementation, the number 2D segmentation masks 910 can be three. Each of the 2D segmentation masks 910 can be processed by the post-processing model 110 using the techniques described above to generate corresponding 2D corrected segmentation masks. In this regard, the post-processing model 110 can be the same 2D SAE model used for processing of 2D input images in accordance with the processed described with reference to FIGS. 6-8. A representative 2D image 908 used to generate the 3D image 902 also be used as input into the post-processing model 110 to facilitate generating the corrected 2D segmentation masks. The corrected 2D segmentation mask can then be combined to generate a corresponding corrected 3D segmentation mask 912 for the volume predicted mask 904.

Figure 9B:
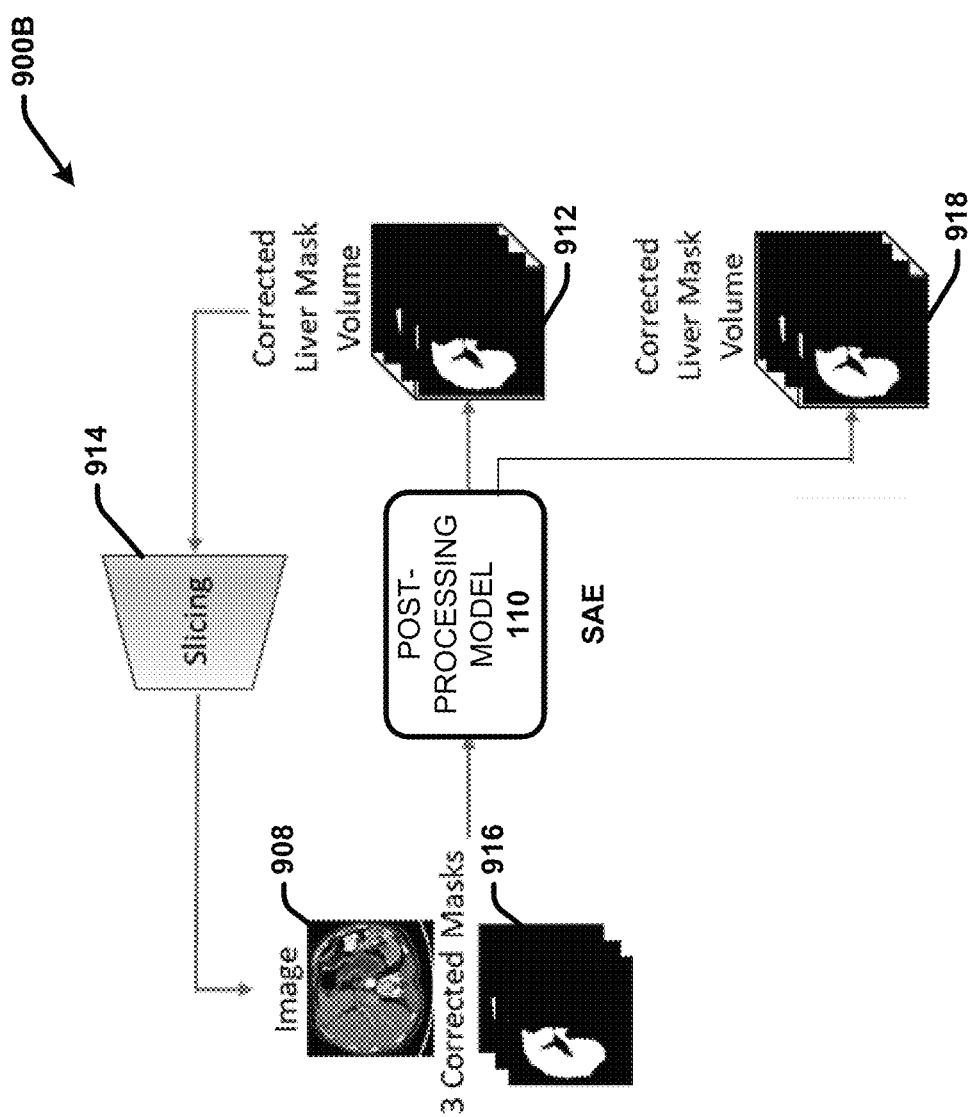
FIG. 9B presents an example multi-iteration post-processing domain adaptation process in accordance with one or more embodiments.

FIG. 9B presents an example multi-iteration post-processing domain adaptation process 900B in accordance with one or more embodiments. In accordance with process 900B the corrected 3D segmentation mask 912 can sliced at 914 to generate a plurality of 2D corrected masks 916. In the embodiment shown, the number of 2D corrected masks 916 generated includes three, which when combined with the representative 2D input image 908 results in a four-channel input for the post-processing model. However, the number of 2D corrected masks 916 generated can vary. The representative 2D input image 908 and the 2D corrected masks 916 can then be run back through the post-processing model 110 to generate another corrected 3D segmentation mask 918 for the volume predicted mask 904. With every pass through the autoencoder the mask accuracy can be improved until a desired saturation level s achieved.

As an example, a post-processing model autoencoder was trained on only 10% contrast exams (about 12 volumes) and used for multi-iterations of a contrast exam. Results are shown in FIGS. 10A and 10B.

Figure 10A:
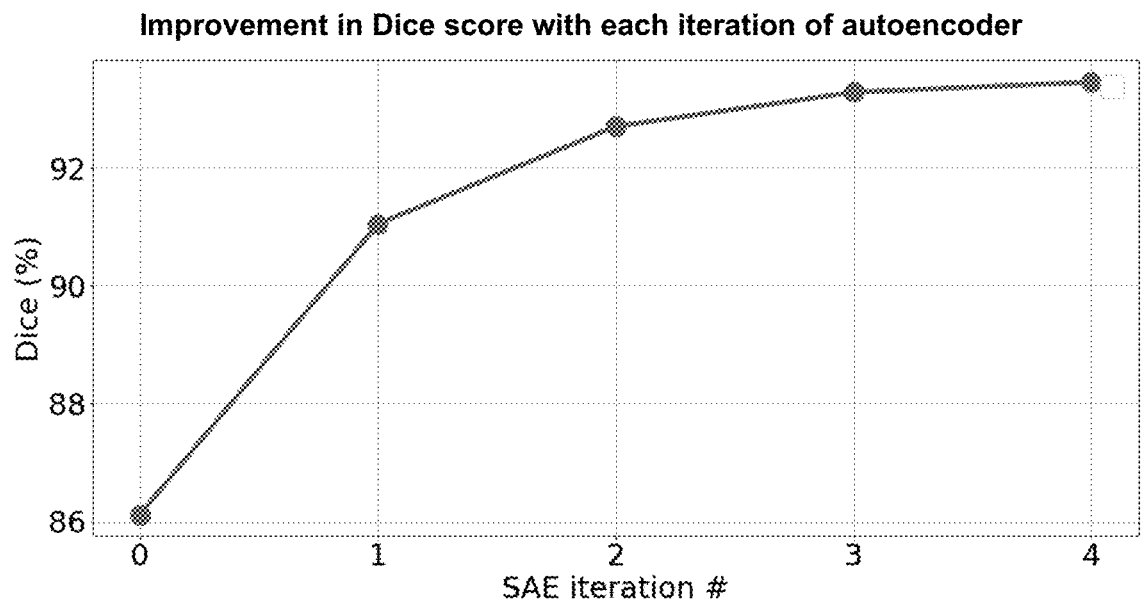
FIG. 10A presents a graph showing the improvement in the Dice scores with each iteration of the autoencoder in accordance with multi-iteration post-processing domain adaptation process in accordance with one or more embodiments.
Figure 10B:
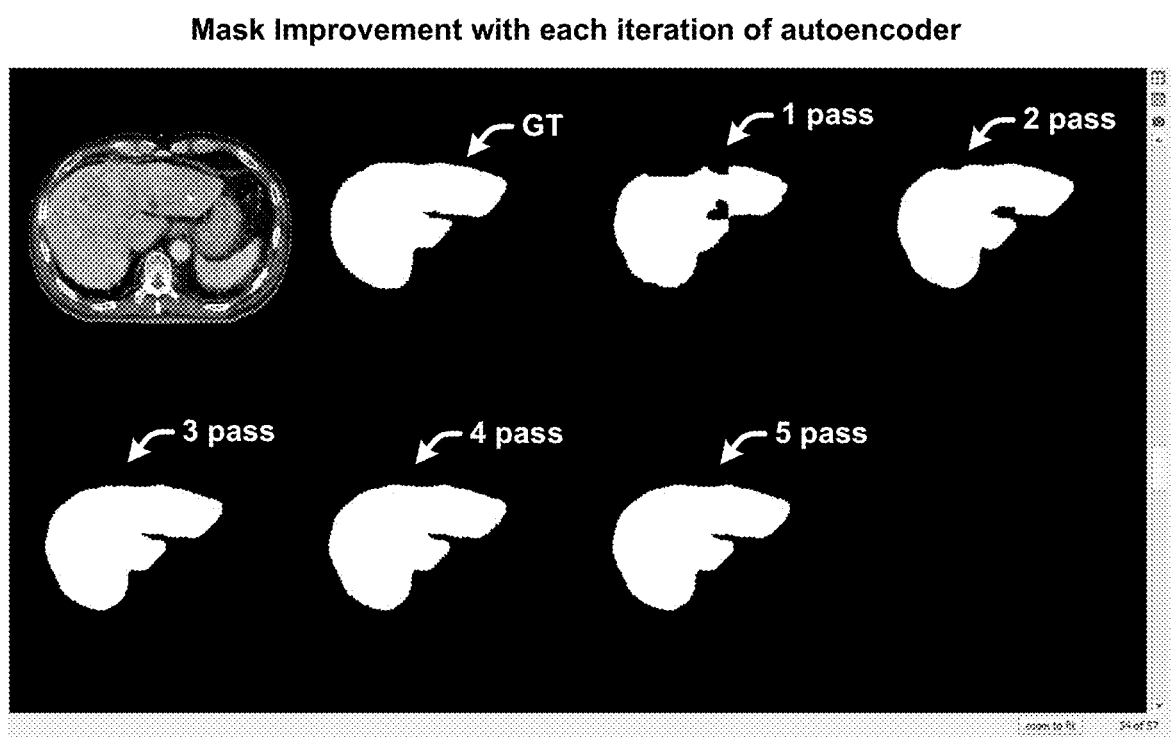
FIG. 10B presents mask improvements with each iteration of the autoencoder in accordance with multi-iteration post-processing domain adaptation process in accordance with one or more embodiments.

FIG. 10A presents a graph showing the improvement in the Dice scores with each iteration of the autoencoder (e.g., with each iteration of process 900B or the like). FIG. 10B presents the resulting mask improvements with each iteration of the autoencoder. In FIG. 10B, the mask from left to right, top to bottom respectively represent the ground truth (GT) prediction from segmentation model and then subsequent corrected masks after each pass through the autoencoder. As shown in FIGS. 10A and 10B, the masks accuracy improves with each iteration until the performance gets saturated after four passes.

Figure 11:
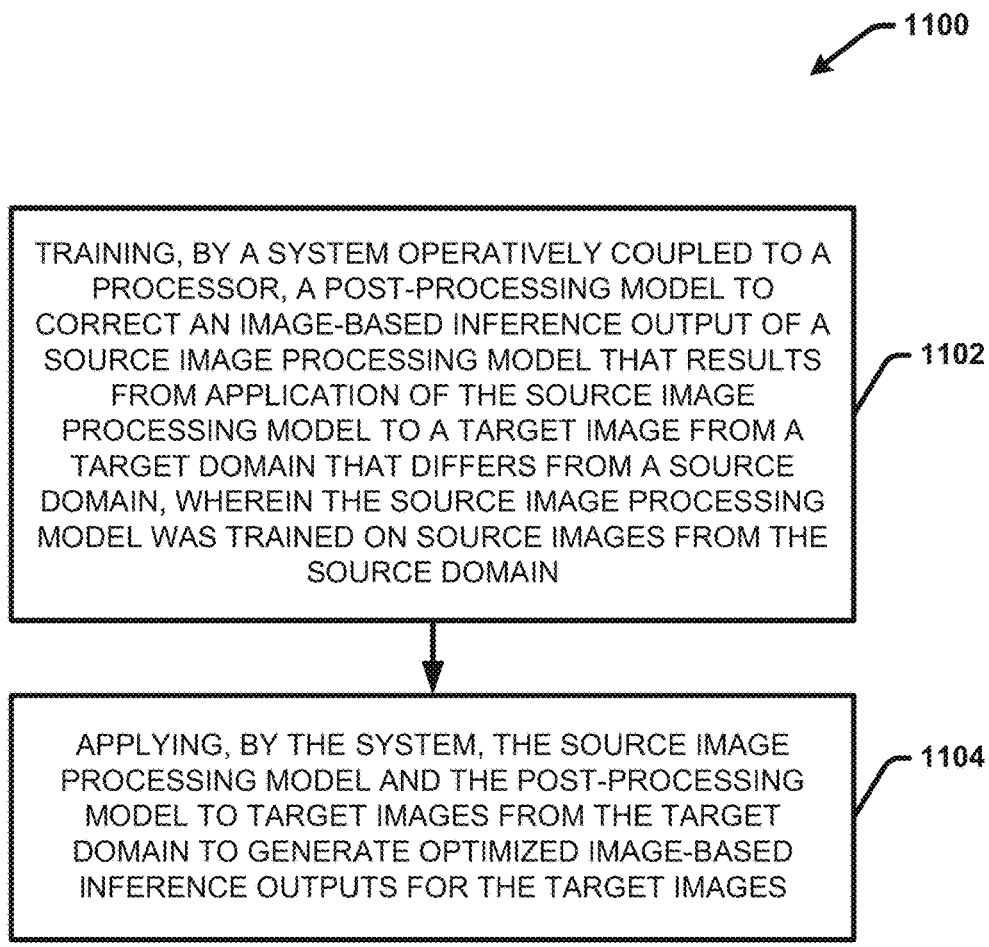
FIG. 11 illustrates an example, high-level flow diagram of a computer-implemented process for domain adaptation of image processing models in accordance with one or more embodiments of the disclosed subject matter.

FIG. 11 illustrates an example, high-level flow diagram of a computer-implemented process 1100 for domain adaptation of image processing models in accordance with one or more embodiments of the disclosed subject matter. Repetitive description of like elements employed in respective embodiments is omitted for sake of brevity.

At 1102, method 1100 comprises training, by a system operatively coupled to a processor (e.g., system 100), a post-processing model to correct an image-based inference output of a source image processing model that results from application of the source image processing model to a target image from a target domain that differs from a source domain, wherein the source image processing model was trained on source images from the source domain. At 1104, method 1100 comprises applying, by the system, the source image processing model and the post-processing model to target images from the target domain to generate optimized image-based inference outputs for the target images.

Figure 12:
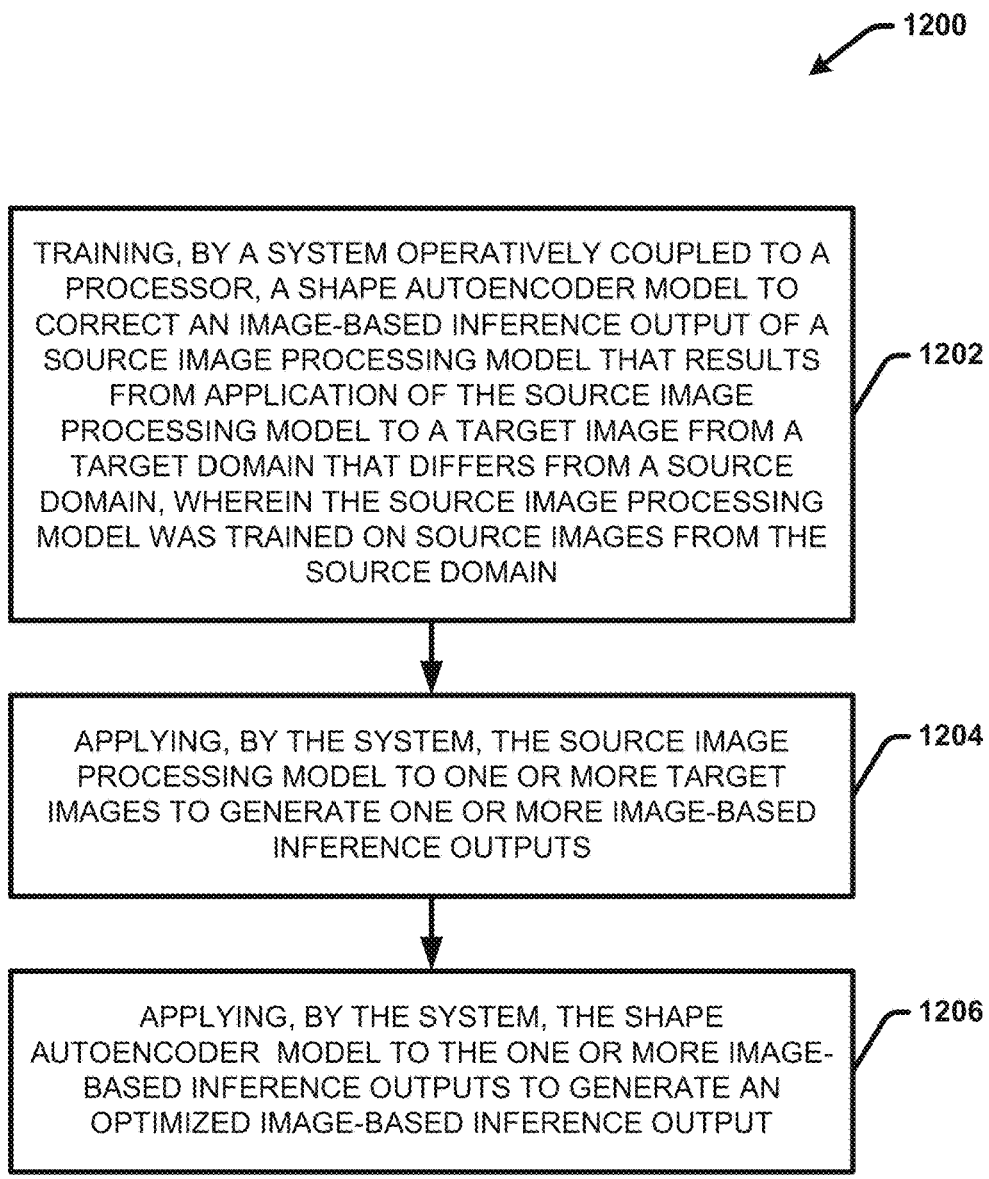
FIG. 12 illustrates another example, high-level flow diagram of a computer-implemented process for domain adaptation of image processing models in accordance with one or more embodiments of the disclosed subject matter.

FIG. 12 illustrates another example, high-level flow diagram of a computer-implemented process 1200 for domain adaptation of image processing models in accordance with one or more embodiments of the disclosed subject matter. Repetitive description of like elements employed in respective embodiments is omitted for sake of brevity.

At 1202, method 1200 comprises training, by a system operatively coupled to a processor (e.g., system 100), an SAE model to correct an image-based inference output of a source image processing model that results from application of the source image processing model to a target image from a target domain that differs from a source domain, wherein the source image processing model was trained on source images from the source domain. At 1204, method 1200 comprises applying, by the system, the source image processing model to one or more target images to generate one or more image-based inference outputs. At 1206, the method further comprising applying, by the system the SAE to the one or more image-based inference outputs to generate an optimized image-based inference output.

Figure 13:
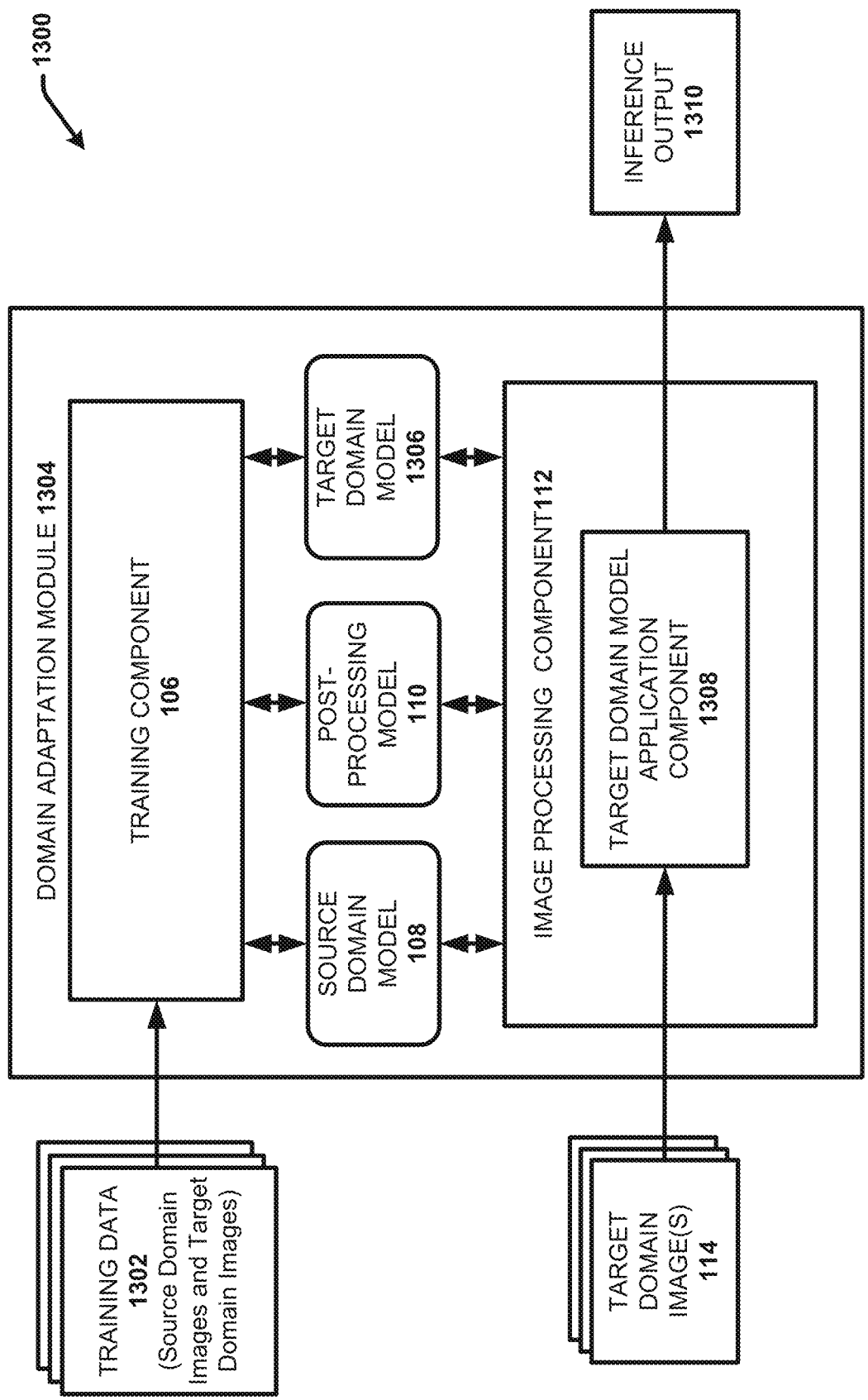
FIG. 13 illustrates a block diagram of another example, non-limiting system that facilitates domain adaptation of image processing models in accordance with one or more embodiments of the disclosed subject matter.

FIG. 13 illustrates a block diagram of another example, non-limiting system 1300 that facilitates domain adaptation of image processing models in accordance with one or more embodiments of the disclosed subject matter. Repetitive description of like elements employed in respective embodiments is omitted for sake of brevity.

The above described method is one approach through which image-based inference outputs (e.g., segmentation masks) for the target domain (contrast images) can be corrected using a SAE as a post-processing step. System 1300 provides another approach for domain adaptation that uses the encoder network of the trained SAE generated using the techniques described above. In accordance with these embodiments, the domain adaptation module 1304 can generate a new target domain model 1306 using the encoder network 306 of the (trained) post-processing model 110 and the decoder of the source domain model 108. The image processing component 112 can further include a target domain application component 1308 that applies the target domain model 1306 to the target domain images 114 to generate an inference output 1310 that is more accurate for the target images relative to an inference. output generated based on application of the source domain model 108 to the target images. In accordance with these embodiments, the encoder network can be used in a generative adversarial network (GAN) architecture to re-tune the source domain model for the target domain model.

Figure 14:
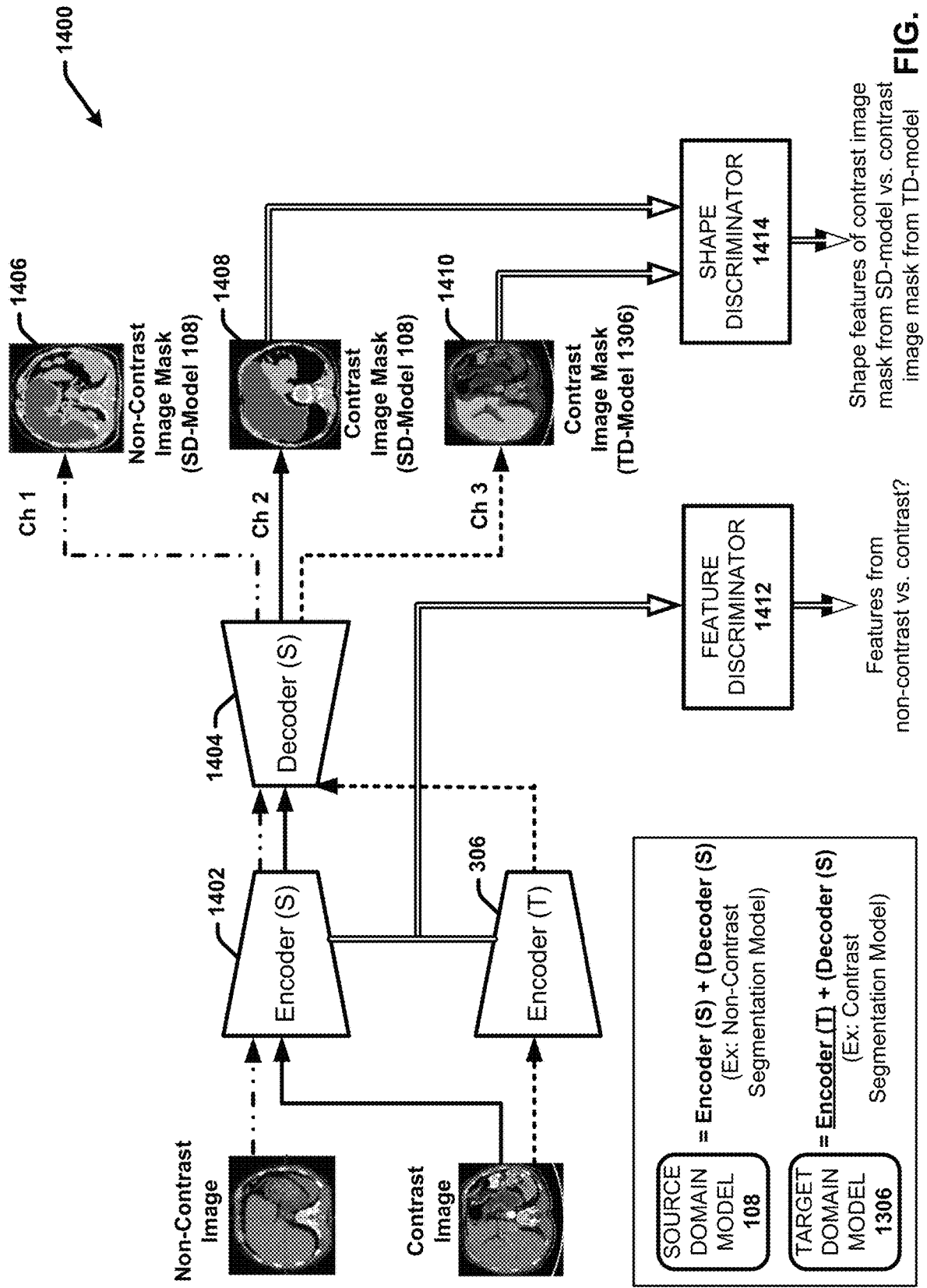
FIG. 14 illustrates an example generative adversarial network (GAN) framework for domain adaptation using shape encoder in accordance with one or more embodiments of the disclosed subject matter.

FIG. 14 illustrates an example generative adversarial network (GAN) framework 1400 for domain adaptation using shape encoder in accordance with one or more embodiments of the disclosed subject matter.

In accordance with one or more additional embodiments, once trained, the encoder network 306 described with reference to FIG. 3 can be used in a GAN network architecture to adapt a source domain model for same or enhanced accuracy on the target domain for which the encoder network 306 was trained. With these embodiments, the source domain model 108 can also employ an autoencoder including an encoder network 1402 and a decoder network 1404. Using a GAN framework, the (trained) encoder network 306 can be used in conjunction with the decoder network 1404 and a shape discriminator network 1414 to help re-train parameters/weights of the source domain model (i.e., the generator) with an adversarial approach.

For example, in implementations in which the source domain model 108 comprises a contrast segmentation model and the target domain comprises contrast images, the SD-model can be applied as originally trained to a non-contrast images to generate a segmentation mask 1406 for the non-contras image in accordance with a first channel (Ch. 1). The source domain model can also be applied to contrast images in accordance with a second channel (Ch. 2) to generate a segmentation mask 1408 for the contrast image, which will presumably have some inaccuracies. The target domain model (including the encoder network 306 and the decoder network 1404) can further be applied to the same contrast images in accordance with a third channel (Ch. 3) to generate a segmentation mask 1410 for the contrast image. The shape discriminator network 1414 can further compare the features of the segmentation mask 1408 with the features of the segmentation mask 1410 to re-train parameters/weights of the source domain model (i.e., the generator) for the target domain with an adversarial approach.

The encoder network 306 can also act as a constraint for another feature-based discriminator 1412 which then updates the source domain model to match source domain images (e.g., non-contrast images) and target domain images (e.g., contrast images) in the feature space while imposing the shape constraint for the targeted organ for segmentation. Doing so results in better model convergence through stability of tuning algorithm with the added shape constraint on the network.

Figure 15:
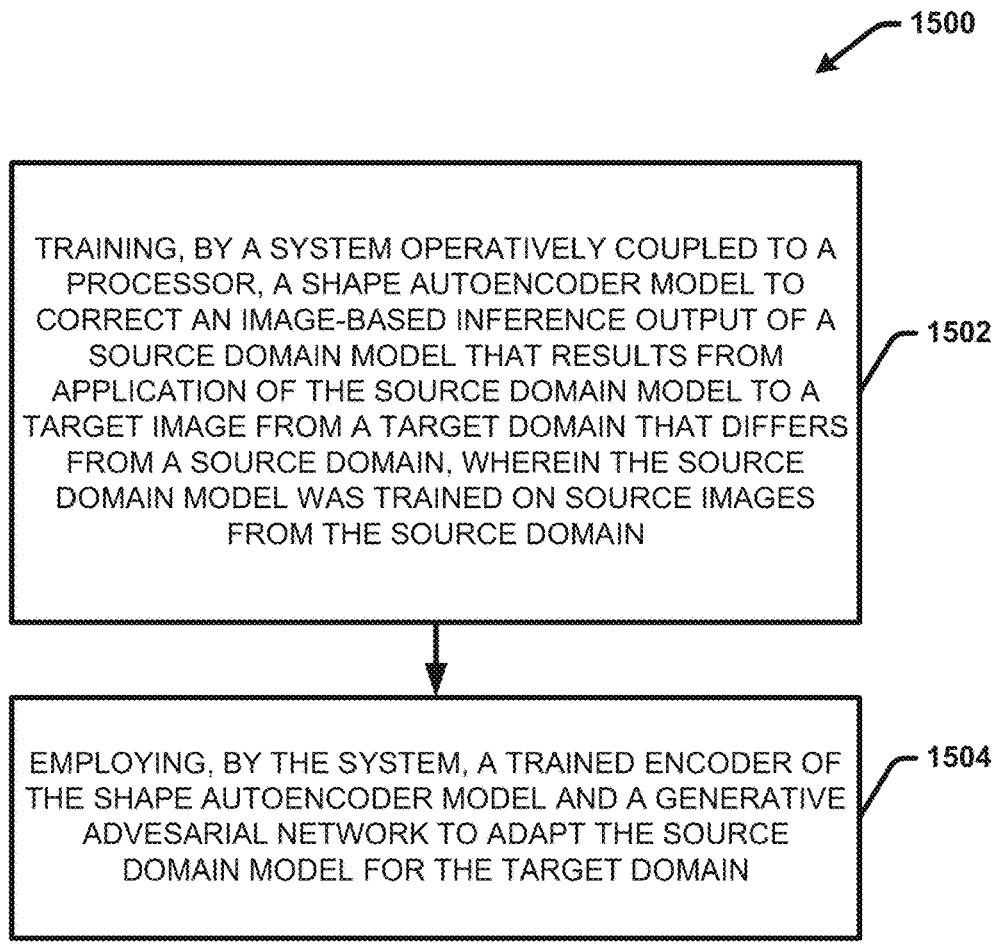
FIG. 15 illustrates an example, high-level flow diagram of another computer-implemented process that facilitates domain adaptation of image processing models in accordance with one or more embodiments of the disclosed subject matter.

FIG. 15 illustrates an example, high-level flow diagram of another computer-implemented process 1500 that facilitates domain adaptation of image processing models in accordance with one or more embodiments of the disclosed subject matter.

At 1502, a system operatively coupled to a processor (e.g., system 1300) trains a shape autoencoder model to correct an image-based inference output of a source domain model that results from application of the source domain model to a target image from a target domain model that differs from a source domain, wherein the source domain model was trained on source images from the source domain. At 1504, the system employs the trained shape autoencoder model and a GAN to adapt the source domain model for the target domain.

Example Operating Environment

One or more embodiments can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 16, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 16:
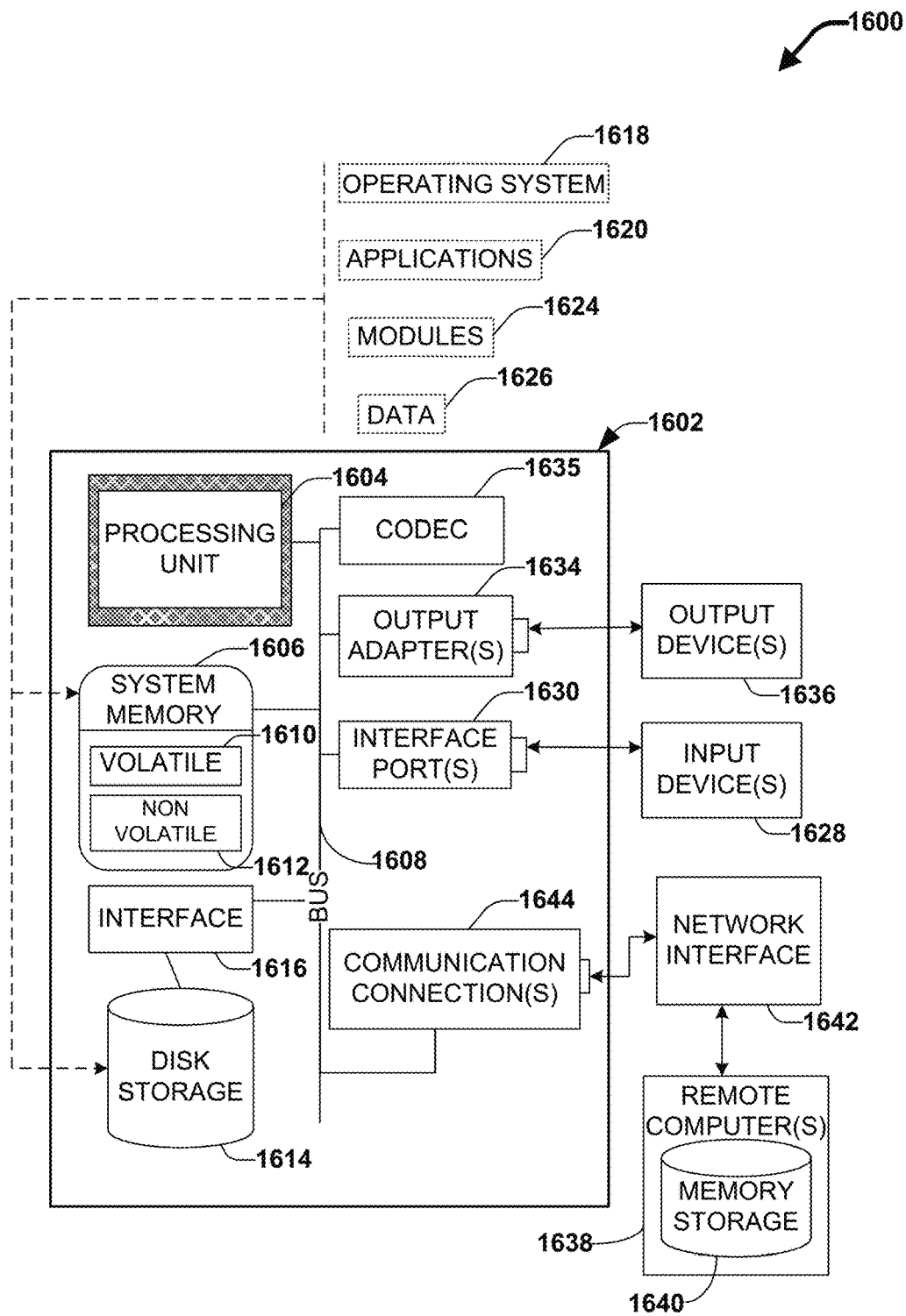
FIG. 16 illustrates a block diagram of an example, non-limiting operating environment in which one or more embodiments described herein can be facilitated.

With reference to FIG. 16, an example environment 1600 for implementing various aspects of the claimed subject matter includes a computer 1602. The computer 1602 includes a processing unit 1604, a system memory 1606, a codec 1635, and a system bus 1608. The system bus 1608 couples system components including, but not limited to, the system memory 1606 to the processing unit 1604. The processing unit 1604 can be any of various available processors. Dual microprocessors and other multiprocessor architectures also can be employed as the processing unit 1604.

The system bus 1608 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1606 includes volatile memory 1610 and non-volatile memory 1612, which can employ one or more of the disclosed memory architectures, in various embodiments. The basic input/output system (BIOS), containing the basic routines to transfer information between elements within the computer 1602, such as during start-up, is stored in non-volatile memory 1612. In addition, according to present innovations, codec 1635 can include at least one of an encoder or decoder, wherein the at least one of an encoder or decoder can consist of hardware, software, or a combination of hardware and software. Although, codec 1635 is depicted as a separate component, codec 1635 can be contained within non-volatile memory 1612. By way of illustration, and not limitation, non-volatile memory 1612 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 1612 can employ one or more of the disclosed memory devices, in at least some embodiments. Moreover, non-volatile memory 1612 can be computer memory (e.g., physically integrated with computer 1602 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 1610 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 1602 can also include removable/non-removable, volatile/non-volatile computer storage medium. FIG. 16 illustrates, for example, disk storage 1614. Disk storage 1614 includes, but is not limited to, devices like a magnetic disk drive, solid state disk (SSD), flash memory card, or memory stick. In addition, disk storage 1614 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1614 to the system bus 1608, a removable or non-removable interface is typically used, such as interface 1616. It is appreciated that disk storage 1614 can store information related to a user. Such information might be stored at or provided to a server or to an application running on a user device. In one embodiment, the user can be notified (e.g., by way of output device(s) 1636) of the types of information that are stored to disk storage 1614 or transmitted to the server or application. The user can be provided the opportunity to opt-in or opt-out of having such information collected or shared with the server or application (e.g., by way of input from input device(s) 1628).

It is to be appreciated that FIG. 16 describes software that acts as an intermediary between users and the basic computer resources described in the suitable operating environment 1600. Such software includes an operating system 1618. Operating system 1618, which can be stored on disk storage 1614, acts to control and allocate resources of the computer 1602. Applications 1620 take advantage of the management of resources by operating system 1618 through program modules 1624, and program data 1626, such as the boot/shutdown transaction table and the like, stored either in system memory 1606 or on disk storage 1614. It is to be appreciated that the claimed subject matter can be implemented with various operating systems or combinations of operating systems.

A user enters commands or information into the computer 1602 through input device(s) 1628. Input devices 1628 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1604 through the system bus 1608 via interface port(s) 1630. Interface port(s) 1630 include, for example, a serial port, a parallel port, a game port, and a universal serial bus (USB). Output device(s) 1636 use some of the same type of ports as input device(s) 1628. Thus, for example, a USB port can be used to provide input to computer 1602 and to output information from computer 1602 to an output device 1636. Output adapter 1634 is provided to illustrate that there are some output devices 1636 like monitors, speakers, and printers, among other output devices 1636, which require special adapters. The output adapters 1634 include, by way of illustration and not limitation, video and sound cards that provide a means of connection between the output device 1636 and the system bus 1608. It should be noted that other devices or systems of devices provide both input and output capabilities such as remote computer(s) 1638.

Computer 1602 can operate in a networked environment using logical connections to one or more remote computers, such as remote computer(s) 1638. The remote computer(s) 1638 can be a personal computer, a server, a router, a network PC, a workstation, a microprocessor based appliance, a peer device, a smart phone, a tablet, or other network node, and typically includes many of the elements described relative to computer 1602. For purposes of brevity, only a memory storage device 1640 is illustrated with remote computer(s) 1638. Remote computer(s) 1638 is logically connected to computer 1602 through a network interface 1642 and then connected via communication connection(s) 1644. Network interface 1642 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1644 refers to the hardware/software employed to connect the network interface 1642 to the bus 1608. While communication connection 1644 is shown for illustrative clarity inside computer 1602, it can also be external to computer 1602. The hardware/software necessary for connection to the network interface 1642 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability;

multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor that executes the computer executable components stored in the memory, wherein the computer executable components comprise:
a training component that trains a post-processing model to correct an image-based inference output of a source image processing model that results from application of the source image processing model to a target image from a target domain that differs from a source domain, wherein the source image processing model was trained on source images from the source domain, wherein the post-processing model comprises a shape autoencoder, and wherein the training component trains the shape autoencoder to transform the image-based inference output and an original input image to the source image processing model into a latent representation in feature space to generate an optimized image-based inference output; and
an image processing component that applies the source image processing model and the post-processing model to one or more target images from the target domain to generate the optimized image-based inference output for the one or more target images.

2. The system of claim 1, wherein the image processing component applies the post-processing model to correct intermediate image-based inference outputs generated based on application of the source image processing model to the one or more target images, resulting in the optimized image-based inference output.

3. The system of claim 2, wherein the image processing component further feeds the optimized image-based inference output back through the post-processing model for one or more iterations to further improve the optimized image-based inference output while maintaining undisturbed performance of the source domain.

4. The system of claim 1, wherein the source images and the one or more target images comprise images of a same object that differ with respect to at least one visual appearance property.

5. The system of claim 1, wherein the source images and the one or more target images comprise medical images of a same type of body part yet differ with respect to capture modality.

6. The system of claim 1, wherein the source images and the one or more target images comprise computed tomography (CT) scans and wherein the source images and the one or more target images differ with respect to having or not having contrast.

7. The system of claim 1, wherein the source imaging processing model comprises an organ segmentation model, and wherein the image-based inference output comprises an organ segmentation mask.

8. The system of claim 1, wherein the source imaging processing model comprises at least one of: a segmentation model, an object recognition model, an anomaly detection model, or an image reconstruction model.

9. The system of claim 1, wherein the source imaging processing model comprises a two-dimensional imaging processing model or a three-dimensional image processing model.

10. The system of claim 1, wherein the training component trains the post-processing model using an unsupervised machine learning process without ground truth training data for the target domain, and wherein the shape autoencoder outputs a segmentation mask and a signed distance map (SDM) of the segmentation mask to minimize losses with corresponding ground truth masks at a network output.

11. The system of claim 1, wherein the training component trains the post-processing model using a semi-supervised machine learning process with ground truth training data for the target domain and the source domain, and wherein the shape autoencoder outputs a segmentation mask and a signed distance map (SDM) of the segmentation mask to minimize losses with corresponding ground truth masks at a network output.

12. The system of claim 1, wherein the post-processing model comprises a single channel input model that receives as input, a single intermediate image-based inference output generated based on application of the source image processing model to a single target domain image, and generates the optimized image-based inference result as output.

13. The system of claim 1, wherein the post-processing model comprises a multi-channel input model that receives as input, at least one consecutively captured target image and a plurality of intermediate image-based inference outputs respectively generated based on application of the source image processing model to the at least one consecutively captured target image, and generates the optimized image-based inference result as output.

14. The system of claim 13, wherein the at least one consecutively captured target image is a middle slice of the multi-channel inputs to the post-processing model.

15. A method, comprising:
training, by a system operatively coupled to a processor, a post-processing model to correct an image-based inference output of a source image processing model that results from application of the source image processing model to a target image from a target domain that differs from a source domain, wherein the source image processing model was trained on source images from the source domain, wherein the post-processing model comprises a shape autoencoder, and wherein the training comprises training the shape autoencoder to transform the image-based inference output and an original input image to the source image processing model into a latent representation in feature space to generate an optimized image-based inference output; and
applying, by the system, the source image processing model and the post-processing model to target images from the target domain to generate optimized image-based inference outputs for the target images.

16. The method of claim 15, wherein the applying comprises applying the post-processing model to correct intermediate image-based inference outputs generated based on application of the source image processing model to the target images while maintaining undisturbed performance of the source domain, resulting in the optimized image-based inference outputs.

17. The method of claim 15, wherein the source images and the target images comprise medical images of a same type of body part yet differ with respect to one or more visual appearance properties.

18. The method of claim 15, wherein the source imaging processing model comprises at least one of: a segmentation model, an object recognition model, an anomaly detection model, or an image reconstruction model.

19. The method of claim 15, wherein the training comprises training the post-processing model using an unsupervised machine learning process without ground truth training data for the target domain, and wherein the shape autoencoder outputs a segmentation mask and a signed distance map (SDM) of the segmentation mask to minimize losses with corresponding ground truth masks at a network output.

20. The method of claim 15, wherein the post-processing model comprises a single channel input model that receives as input, a single intermediate image-based inference output generated based on application of the source image processing model to a single target domain image, and generates an optimized image-based inference result as output.

21. The method of claim 15, wherein the post-processing model comprises a multi-channel input model that receives as input, at least one consecutively captured target image and a plurality of intermediate image-based inference outputs respectively generated based on application of the source image processing model to the at least one consecutively captured target image, and generates an optimized image-based inference result as output.

22. The method of claim 21, wherein the at least one consecutively captured target image is a middle slice of the multi-channel inputs to the post-processing model.

23. A non-transitory machine-readable storage medium, comprising executable instructions that, when executed by a processor, facilitate performance of operations, comprising:
training a post-processing model to correct an image-based inference output of a source image processing model that results from application of the source image processing model to a target image from a target domain that differs from a source domain, wherein the source image processing model was trained on source images from the source domain, wherein the post-processing model comprises a shape autoencoder, and wherein the training comprises training the shape autoencoder to transform the image-based inference output and an original input image to the source image processing model into a latent representation in feature space to generate an optimized image-based inference output; and
applying the source image processing model and the post-processing model to target images from the target domain to generate optimized image-based inference outputs for the target images.

24. The non-transitory machine-readable storage medium of claim 23, wherein the applying comprises applying the post-processing model to correct intermediate image-based inference outputs generated based on application of the source image processing model to the target images while maintaining undisturbed performance of the source domain, resulting in the optimized image-based inference outputs.

25. The non-transitory machine-readable storage medium of claim 23, wherein the source images and the target images comprise medical images of a same type of body part yet differ with respect to one or more visual appearance properties.

26. The non-transitory machine-readable storage medium of claim 23, wherein the training comprises training the post-processing model using an unsupervised machine learning process without ground truth training data for the target domain, and wherein the shape autoencoder outputs a segmentation mask and a signed distance map (SDM) of the segmentation mask to minimize losses with corresponding ground truth masks at a network output.

27. The non-transitory machine-readable storage medium of claim 23, wherein the post-processing model comprises a single channel input model that receives as input, a single intermediate image-based inference output generated based on application of the source image processing model to a single target domain image, and generates an optimized image-based inference result as output.

\* \* \* \* \*